United States Patent
Bando et al.

(10) Patent No.: US 11,092,960 B2
(45) Date of Patent: Aug. 17, 2021

(54) REMOTE VEHICLE CONTROL DEVICE AND REMOTE VEHICLE CONTROL METHOD

(71) Applicant: DENSO TEN Limited, Kobe (JP)

(72) Inventors: Fumiaki Bando, Kobe (JP); Minoru Maehata, Kobe (JP); Miki Hitotsuya, Kobe (JP)

(73) Assignee: DENSO TEN Limited, Kobe (JP)

( * ) Notice: Subject to any disclaimer, the term of this patent is extended or adjusted under 35 U.S.C. 154(b) by 337 days.

(21) Appl. No.: 16/227,703

(22) Filed: Dec. 20, 2018

(65) Prior Publication Data

US 2019/0286121 A1 Sep. 19, 2019

(30) Foreign Application Priority Data

Mar. 15, 2018 (JP) .............................. JP2018-048360

(51) Int. Cl.
*B05D 1/00* (2006.01)
*G05D 1/02* (2020.01)
*G05D 1/00* (2006.01)

(52) U.S. Cl.
CPC ......... *G05D 1/0038* (2013.01); *G05D 1/0016* (2013.01); *G05D 1/0231* (2013.01)

(58) Field of Classification Search
None
See application file for complete search history.

(56) References Cited

U.S. PATENT DOCUMENTS

| 8,903,568 B1 | 12/2014 | Wang et al. |
| 2009/0248220 A1 | 10/2009 | Ecton et al. |

(Continued)

FOREIGN PATENT DOCUMENTS

| JP | 2010-095027 A | 4/2010 |
| JP | 2014-065392 A | 4/2014 |

(Continued)

OTHER PUBLICATIONS

U.S. Appl. No. 16/227,174, filed Dec. 20, 2018 in the name of Bando et al.

(Continued)

*Primary Examiner* — Abdhesh K Jha
(74) *Attorney, Agent, or Firm* — Oliff PLC

(57) ABSTRACT

A remote vehicle control device includes: a display unit; an operation unit configured for controlling a vehicle; a signal generating unit configured to generate control signals for the vehicle, based on operations on the operation unit; a communication unit configured to perform communication with the vehicle and another remote vehicle control device; and an authority managing unit that manages a control authority for the vehicle. Synthetic images showing a surrounding area of the vehicle as seen from a virtual viewpoint each are generated on the basis of plural images acquired by plural on-board cameras mounted on the vehicle, respectively, and the display unit displays the synthetic images. The communication unit transmits the control signals to the vehicle. The authority managing unit performs transfer of the control authority for the vehicle in cooperation with the another remote vehicle control device via the communication unit.

14 Claims, 19 Drawing Sheets

(56) References Cited

U.S. PATENT DOCUMENTS

| | | | |
|---|---|---|---|
| 2013/0194256 A1 | 8/2013 | Gassmann et al. | |
| 2014/0247352 A1 | 9/2014 | Rathi et al. | |
| 2014/0333729 A1 | 11/2014 | Pflug | |
| 2015/0356735 A1 | 12/2015 | Shimizu et al. | |
| 2017/0308080 A1* | 10/2017 | Brooks | G05D 1/0027 |
| 2017/0324943 A1 | 11/2017 | Wu et al. | |
| 2019/0077509 A1* | 3/2019 | Hsu | H04N 7/185 |
| 2019/0094849 A1 | 3/2019 | Kim et al. | |
| 2019/0192055 A1 | 6/2019 | Mizobuchi | |
| 2019/0278298 A1* | 9/2019 | Pedersen | G05D 1/0297 |
| 2020/0097001 A1* | 3/2020 | Lavoie | B62D 15/027 |
| 2020/0264604 A1* | 8/2020 | Tao | H04W 12/001 |
| 2020/0278673 A1* | 9/2020 | Nakagawa | G05D 1/005 |

FOREIGN PATENT DOCUMENTS

| | | | |
|---|---|---|---|
| JP | 2016-074285 A | | 5/2016 |
| JP | 2016/201613 A | | 12/2016 |
| JP | 2016/222243 A | | 12/2016 |
| JP | 2016222243 A | * | 12/2016 |
| JP | 2018-063294 A | | 4/2018 |

OTHER PUBLICATIONS

U.S. Appl. No. 16/226,907, filed Dec. 20, 2018 in the name of Bando et al.
U.S. Appl. No. 16/227,261, filed Dec. 20, 2018 in the name of Nakamura et al.
U.S. Appl. No. 16/227,377, filed Dec. 20, 2018 in the name of Bando et al.
Feb. 5, 2020 Office Action issued in U.S. Appl. No. 16/227,377.
Mar. 3, 2020 Office Action issued in U.S. Appl. No. 16/227,174.
Apr. 8, 2021 Office Action issued in U.S. Appl. No. 16/226,907.

* cited by examiner

REMOTE VEHICLE CONTROL DEVICE AND REMOTE VEHICLE CONTROL METHOD

CROSS-REFERENCE TO RELATED APPLICATIONS

This application is based on and claims priority under 35 USC 119 from Japanese Patent Application No. 2018-48360 filed Mar. 15, 2018.

BACKGROUND

Technical Field

The present invention relates to a remote vehicle control device and a remote vehicle control method.

Related Art

Recently, various technologies relates to remote vehicle control have been proposed. For example, a mobile terminal proposed in Patent Literature 1 is a terminal for moving a vehicle from a first position to a second position. This mobile terminal displays bird's eye view images including an image of the vehicle on the basis of images acquired by a camera installed in the terminal, and receives user's operations for the vehicle. Also, for example, a parking assistance device proposed in Patent Literature 2 makes it possible to park a vehicle using a remote control means such as a joystick. Also, for example, a remote vehicle control system proposed in Patent Literature 3 includes a mobile terminal, which transmits control signals corresponding to touch operations on a touch panel, to a vehicle. This mobile terminal can transmit travel control signals and steering control signals to the vehicle.

[Patent Literature 1] Japanese Patent Application Laid-Open No. 2014-65392
[Patent Literature 2] Japanese Patent Application Laid-Open No. 2010-95027
[Patent Literature 3] Japanese Patent Application Laid-Open No. 2016-74285

SUMMARY

However, the technologies according to the related art have a problem that convenience and operability in remote vehicle control are not thoroughly satisfactory.

The present invention was made in view of the above-mentioned problem, and an object of the present invention is to provide a technology capable of improving convenience and operability in remote vehicle control.

According to an aspect of the present disclosure, there is provided a remote vehicle control device including: a display unit; an operation unit configured for controlling a vehicle; a signal generating unit configured to generate control signals for the vehicle, based on operations on the operation unit; a communication unit configured to perform communication with the vehicle and another remote vehicle control device; and an authority managing unit that manages a control authority for the vehicle. Synthetic images showing a surrounding area of the vehicle as seen from a virtual viewpoint each are generated on the basis of plural images acquired by plural on-board cameras mounted on the vehicle, respectively, and the display unit displays the synthetic images, the communication unit transmits the control signals to the vehicle, and the authority managing unit performs transfer of the control authority for the vehicle in cooperation with the another remote vehicle control device via the communication unit.

In the remote vehicle control device, the communication unit may receive the synthetic images generated in the vehicle, from the vehicle.

In the remote vehicle control device, the control signals may include signals related to control on the viewpoint positions and sight line directions of the synthetic images.

In the remote vehicle control device, the authority managing unit may separately manage each of plural types of control authority for the vehicle, between the remote vehicle control device and the another remote vehicle control device.

In the remote vehicle control device, the authority managing unit may manage some of the plural types of control authority for the vehicle, such that they are handled as one in the remote vehicle control device and the another remote vehicle control device.

In the remote vehicle control device, the authority managing unit may manage some of the plural types of control authority for the vehicle, such that they are shared by the remote vehicle control device and the another remote vehicle control device.

In the remote vehicle control device, the communication unit may receive display images of the display unit of the another remote vehicle control device, from the another remote vehicle control device, and the display unit may display the display images.

In the remote vehicle control device, at a beginning of synthetic image display, the display unit may consecutively display synthetic images along the circumference of the surrounding area of the vehicle.

In the remote vehicle control device, at a beginning of synthetic image display, the display unit may display a synthetic image as seen from an opposite side of the vehicle to a location of the remote vehicle control device.

In the remote vehicle control device, as the remote vehicle control device moves, the display unit may display synthetic images based on different viewpoint positions and different sight line directions.

In the remote vehicle control device, the communication unit may receive information related to a controlled state of the vehicle, from the vehicle, and the display unit may display the information related to the controlled state.

In the remote vehicle control device, the communication unit may receive in-vehicle perspective images obtained by imaging an inside of the vehicle, from the vehicle, and the display unit may display the in-vehicle perspective images.

The remote vehicle control device may further include a sensor unit configured to detect a tilt of the remote vehicle control device. The display unit may display synthetic images based on a different viewpoint position and a different sight line direction, on the basis of the tilt.

The remote vehicle control device may further include a storage unit configured to store the synthetic images displayed on the display unit.

According to an aspect of the present disclosure, there is provided a remote vehicle control method including: generating each of synthetic images of a surrounding area of a vehicle as seen from virtual viewpoints, on the basis of plural images acquired by plural on-board cameras mounted on the vehicle, respectively; displaying the synthetic images on a remote vehicle control device; receiving operations for the vehicle on the remote vehicle control device; generating control signals for the vehicle, on the basis of the operations; transmitting the control signals from the remote vehicle control device to the vehicle; and performing transfer of control authority for the vehicle between the remote vehicle control device and another remote vehicle control device.

According to the configuration of the present invention, people may perform remote control on the vehicle while checking the surrounding area of the vehicle on the synthetic images. For example, in the case where a blind area occurs, the user may hand over the control authority for the vehicle to another person easy to check the condition in the blind area. Also, even in the case where the user has handed over the control authority for the vehicle to another person, during an emergency, the user may stop the vehicle. In other words, it is possible to improve convenience and operability in remote control on the vehicle.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the drawings. However, the present invention is not limited to the contents of the embodiments to be described below.

Also, in the following description, in the straight advancing direction of a vehicle, the direction from the driver's seat toward the steering wheel is referred to as the forward direction (the front side). In the straight advancing direction of the vehicle, the direction from the steering wheel toward the driver's seat is referred to as the backward direction (the rear side). In the direction perpendicular to the straight advancing direction of the vehicle and the vertical direction, the direction from the right side of the driver facing forward to the left side is referred to as the left direction. In the direction perpendicular to the straight advancing direction of the vehicle and the vertical direction, the direction from the left side of the driver facing forward to the right side is referred to as the right direction.

1. Configuration of Remote Vehicle Control System

Figure 1:
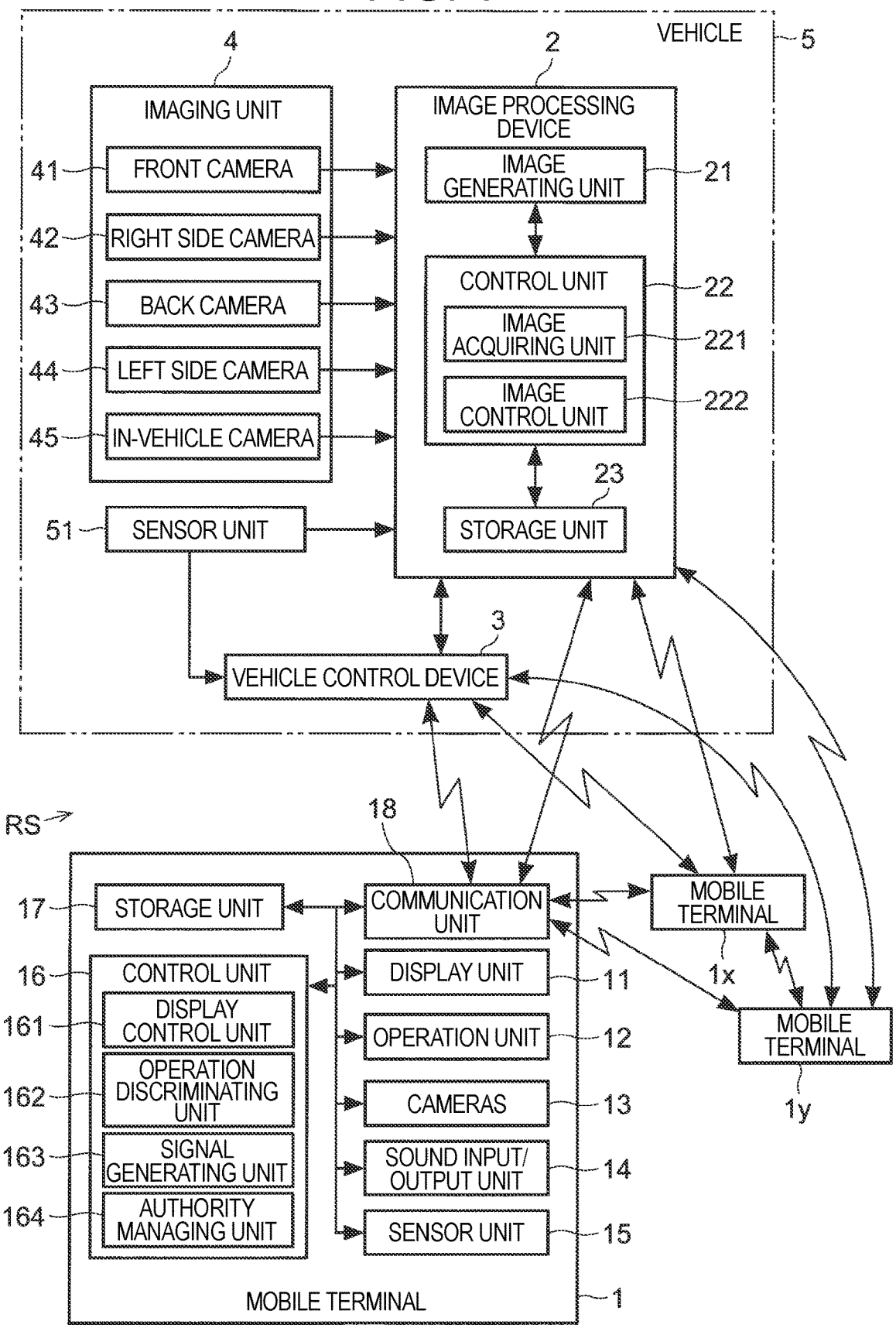
FIG. 1 is a block diagram illustrating the configuration of a remote vehicle control system of an embodiment.

FIG. 1 is a block diagram illustrating the configuration of a remote vehicle control system RS of an embodiment. The remote vehicle control system RS includes a mobile terminal 1, an image processing device 2, and a vehicle control device 3.

The mobile terminal 1 is a remote vehicle control device for remotely controlling a vehicle 5. The vehicle 5 is, for example, a passenger vehicle. Also, the remote vehicle control system RS may remotely control the vehicle 5 by each of plural mobile terminals 1, 1x, and 1y which is remote vehicle control devices. Although the mobile terminals 1x and 1y are not shown in detail in the drawings, the mobile terminals 1, 1x, and 1y have the same configuration for remote control on the vehicle 5.

The image processing device 2 and the vehicle control device 3 are mounted on the vehicle 5. The remote vehicle control system RS is a system for remotely controlling the vehicle 5 by the mobile terminals 1, 1x, and 1y capable of displaying synthetic images showing the surrounding area of the vehicle 5. The vehicle 5 further includes an imaging unit 4 (on-board cameras) and a sensor unit 51.

The mobile terminal 1 is a device configured to receive images for display which are output from the image processing device 2, and display the images, and transmits control signals to the vehicle control device 3, to remotely control the vehicle 5. Examples of the mobile terminal 1 include smart phones, tablet type terminals, and so on belonging to the owner of the vehicle 5 and so on. In the present embodiment, the mobile terminal 1 is, for example, a smart phone.

The image processing device 2 is a device configured to process images acquired by the on-board cameras. For each vehicle equipped with on-board cameras, an image processing device 2 is provided. In the present embodiment, the image processing device 2 acquires images from the imaging unit 4, and processes the images. Also, the image processing device 2 may acquire information from the sensor unit 51, and perform determinations related to image processing on the basis of the acquired information. Also, the image processing device 2 transmits information to the mobile terminal 1 and the vehicle control device 3, and receives information from them. The image processing device 2 may output images for display generated by the image processing device 2, to the mobile terminal 1.

The vehicle control device 3 performs control on the general operation of the vehicle. The vehicle control device 3 includes, for example, an engine ECU (Electronic Control Unit) for controlling the engine, a steering ECU for controlling the steering, a brake ECU for controlling the brake, a shift ECU for controlling the shift, a power source control ECU for controlling the power source, a light ECU for controlling the lights, a mirror ECU for controlling the electric mirrors, and so on. In the present embodiment, the vehicle control device 3 transmits information to the mobile terminal 1 and the image processing device 2, and receives information from them. The vehicle control device 3 receives control signals for the vehicle 5, from the mobile terminal 1, and controls the vehicle 5 on the basis of the control signals.

Figure 2:
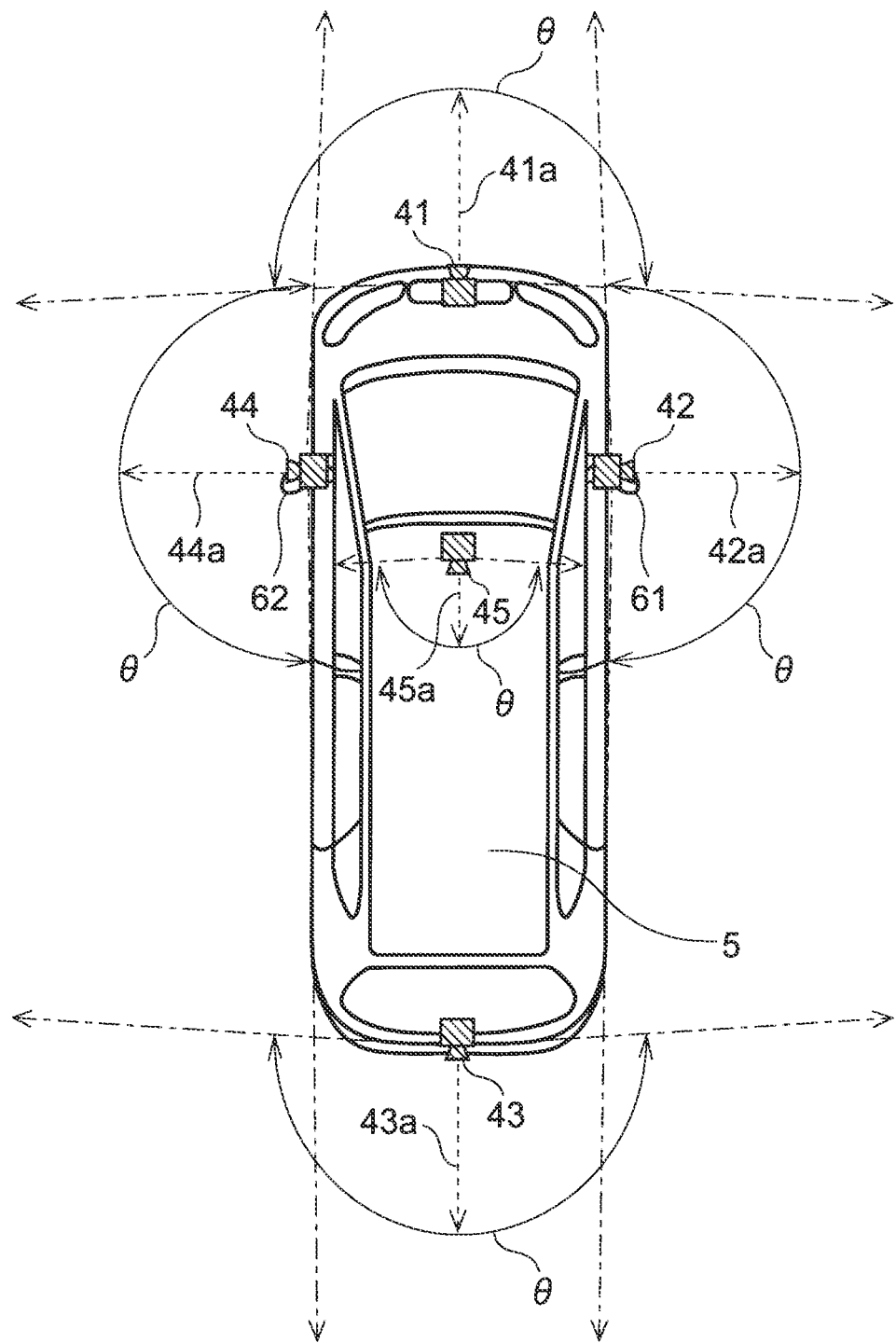
FIG. 2 is a view illustrating positions on a vehicle where on-board cameras are disposed.

The imaging unit 4 is installed for monitoring the condition in the surrounding area of the vehicle and the condition inside the vehicle. The imaging unit 4 includes, for example, five on-board cameras 41 to 45. FIG. 2 is a view illustrating positions on the vehicle 5 where the on-board cameras 41 to 45 are disposed.

The on-board camera 41 is installed on the front end of the vehicle 5. Therefore, the on-board camera 41 is also referred to as the front camera 41. The optical axis 41a of the front camera 41 extends along the longitudinal direction of the vehicle 5 as seen in a plan view illustrating the vehicle as seen from the above. The front camera 41 images the area in front of the vehicle 5. The on-board camera 43 is installed on the rear end of the vehicle 5. Therefore, the on-board camera 43 is also referred to as the back camera 43. The optical axis 43a of the back camera 43 extends along the longitudinal direction of the vehicle 5 as seen in a plan view illustrating the vehicle as seen from the above. The back camera 43 images the area behind the vehicle 5. It is preferable that the installation positions of the front camera 41 and the back camera 43 be at the center in the width direction of the vehicle 5; however, the front camera and the back camera may be slightly deviated to the left or the right from the center in the width direction.

The on-board camera 42 is installed on a right mirror 61 of the vehicle 5. Therefore, the on-board camera 42 is also referred to as the right side camera 42. The optical axis 42a of the right side camera 42 extends along the width direction of the vehicle 5 as seen in a plan view illustrating the vehicle as seen from the above. The right side camera 42 images the area on the right side of the vehicle 5. The on-board camera 44 is installed on a left mirror 62 of the vehicle 5. Therefore, the on-board camera 44 is also referred to as the left side camera 44. The optical axis 44a of the left side camera 44 extends along the width direction of the vehicle 5 as seen in a plan view illustrating the vehicle as seen from the above. The left side camera 44 images the area on the left side of the vehicle 5.

However, in the case where the vehicle 5 is a so-called door-mirror-less vehicle, the right side camera 42 may be installed in the vicinity of the pivot (hinge part) of the right side door, without interposing a door mirror therebetween, and the left side camera 44 may be installed in the vicinity of the pivot (hinge part) of the left side door, without interposing a door mirror therebetween.

The on-board camera 45 is installed on the front end inside the vehicle 5. Therefore, the on-board camera 45 is also referred to as the in-vehicle camera 45. The in-vehicle camera 45 is disposed, for example, on the upper side in front of the driver's seat or the front passenger seat, or on the upper side in front of a space between the driver's seat and the front passenger seat. The optical axis 45a of the in-vehicle camera 45 extends along the longitudinal direction of the vehicle 5 as seen in a plan view illustrating the vehicle as seen from the above. The in-vehicle camera 45 images the inside of the vehicle from the front side toward the rear side.

As lenses for the on-board cameras 41 to 45, for example, fisheye lenses are used. Each of the on-board cameras 41 to 44 has an angle of view θ equal to or greater than 180 degrees in the horizontal direction. Therefore, it is possible to image the area around the vehicle 5 in the horizontal direction. Similarly, the in-vehicle camera 45 also has an angle of view of about 180 degrees in the horizontal direction, so it may image the whole of the inside of the vehicle 5 in the horizontal direction.

FIG. 1 will be further described. The sensor unit 51 includes plural sensors for detecting information related to the vehicle 5 equipped with the on-board cameras 41 to 45. In information related to the vehicle 5, information on the vehicle and information on the surrounding area of the vehicle may be included. In the present embodiment, in the sensor unit 51, for example, a vehicle velocity sensor for detecting the velocity of the vehicle, a steering angle sensor for detecting the rotation angle of the steering, a shift sensor for detecting the operation position of the shift lever of the transmission of the vehicle, an illuminance sensor for detecting the illuminance in the surrounding area of the vehicle, a vibration sensor for detecting vibration of the vehicle, a tilt sensor for detecting the tilt of the vehicle, obstacle sensors for detecting people, animals, vehicles, and other objects in the surrounding area of the vehicle, and so on are included.

The obstacle sensors may use, for example, ultrasonic sensors, light sensors using infrared light or the like, radars, and the like to detect people, animals, vehicles, and other objects in the surrounding area of the vehicle. The obstacle sensors are embedded at plural positions, for example, in the front bumper, the rear bumper, the doors, and so on of the vehicle 5. The obstacle sensors transmit transmission waves toward the surrounding area of the vehicle, and receive waves reflected from people, other vehicles, and so on, to detect whether there are objects such as people, other vehicles, and so on, and the directions and positions of objects.

2. Configurations of Mobile Terminals

The mobile terminal 1 is configured to include a display unit 11, an operation unit 12, cameras 13, a sound input/output unit 14, a sensor unit 15, a control unit 16, a storage unit 17, and a communication unit 18.

The display unit 11 is disposed on the front surface of the mobile terminal 1 which is a smart phone. In the present embodiment, the display unit 11 has a touch panel, as a part of the operation unit 12, on the front surface, and the touch panel is, for example, a liquid crystal display panel. The display unit 11 displays, for example, images for display output from the image processing device 2, on the screen.

The operation unit 12 includes, for example, the touch panel provided on the front surface of the display unit 11, other operation buttons, and so on. The operation unit 12 is configured such that a user may input information from the outside, i.e. the user may perform operations such as operations of inputting characters, numbers, and so on, operations of selecting a menu or a choice, and operations for performing or canceling a process. In the present embodiment, the operation unit 12 is a touch panel usable to operate the vehicle 5. However, the operation unit 12 is not limited to software keys using a touch panel or the like, and may be hardware keys provided as physical input units on the mobile terminal 1.

The cameras 13 are disposed on the front surface and rear surface of the mobile terminal 1 which is a smart phone. The front camera 13 images the front surface side of the surrounding area of the mobile terminal 1. The rear camera 13 images the rear surface side of the surrounding area of the mobile terminal 1.

The sound input/output unit 14 includes, for example, a microphone and a speaker. The microphone acquires information on sounds around the mobile terminal 1, including sound which is uttered by the user. The speaker emits notifying sound, sound on a communication line, and so on to the outside.

The sensor unit 15 has sensors for detecting information related to the mobile terminal 1. In the present embodiment, the sensor unit 15 includes, for example, a vibration sensor for detecting vibration of the mobile terminal 1, a tilt sensor for detecting the tilt of the mobile terminal 1, a GPS (Global Positioning System) sensor for acquiring information on the location of the mobile terminal 1, and so on. The vibration sensor may also detect impacts on the mobile terminal 1. As the vibration sensor and the tilt sensor, for example, an accelerator sensor and a gyroscope sensor may be used together so as to detect vibration, impact, and a tilt with respect to the mobile terminal 1. As for impacts, specifically, the sensor unit 15 may detect change in acceleration of the mobile terminal 1, and may also detect impacts of sound such as sound which the user utters and sound which is created by snapping fingers (air vibration). Also, the sensor unit 15 has a vibration motor for a vibration function of the mobile terminal 1.

The control unit 16 is a so-called microcomputer including a CPU (Central Processing Unit), a RAM (Random Access Memory), and a ROM (Read Only Memory) (not shown in the drawings). The control unit 16 performs information processing and information transmission and reception on the basis of a program stored in the storage unit 17. The control unit 16 is connected to the display unit 11, the operation unit 12, the cameras 13, the sound input/output unit 14, the sensor unit 15, the storage unit 17, and the communication unit 18 by wire.

The control unit 16 includes a display control unit 161, an operation discriminating unit 162, a signal generating unit 163, and an authority managing unit 164. The CPU performs arithmetic processing according to a program, whereby the functions of the individual components of the control unit 16 are implemented.

The display control unit 161 controls display contents of the display unit 11. For example, if receiving inputs for performing and setting various functions of the mobile terminal 1, the display control unit 161 controls the display unit 11 such that the display unit displays function images related to the functions. The function images are images corresponding to various functions of the mobile terminal 1, and includes, for example, icons, buttons, software keys, slide bars, slide switches, check boxes, text boxes, and so on. The user may select the function images displayed on the display unit 11 by touching the touch panel (the operation unit 12), thereby performing and setting various functions of the mobile terminal 1.

The operation discriminating unit 162 receives detection signals output from the touch panel (the operation unit 12), and discriminates the contents of operations performed on the touch panel, on the basis of the detection signals. The operation discriminating unit 162 discriminates operations such as tapping, dragging, flicking, and so on, besides information on positions on the touch panel. In the case of operations using moving, such as dragging and flicking, the operation discriminating unit also discriminates the movement directions, the movement distances, and so on.

The signal generating unit 163 generates control signals for the vehicle 5, on the basis of operations on the operation unit 12. The generated control signals for the vehicle 5 are transmitted to the vehicle 5 via the communication unit 18.

The authority managing unit 164 manages the control authority for the vehicle 5. The vehicle 5 may be remotely controlled by each of the plural mobile terminals 1, 1*x*, and 1*y* which is remote vehicle control devices. The authority managing unit 164 gives the control authority for the vehicle 5 to any one of the mobile terminals 1*x* and 1*y* or receives the control authority from any one of them, via the communication unit 18.

Also, the control authority for the vehicle 5 includes plural types of control authority, such as control authority related to traveling of the vehicle 5, and control authority related to stopping of the vehicle 5. The control authority related to traveling of the vehicle 5 may be further classified, for example, into control authority for the accelerator, and control authority for the steering wheel, and so on. The authority managing unit 164 separately manages each of the plural types of control authority for the vehicle 5, between the mobile terminal 1 and the other mobile terminals 1*x* and 1*y*. In other words, for example, it is possible to manage the control authority such that the control authority for the accelerator is given to the mobile terminal 1, and the control authority for the steering wheel is given to the mobile terminal 1*x*, and any control authority related to traveling of the vehicle 5 is not given to the mobile terminal 1*y*. However, it is preferable that the control authority related to stopping of the vehicle 5, i.e. the control authority for the brake should be given to every mobile terminal. In this case, a method of giving control authority for abnormal stopping (quick brake control for stopping) to every mobile terminal and giving control authority for normal stopping (brake control including designation of strength for stopping or decelerating) to one mobile terminal is also preferable.

The storage unit 17 is a non-volatile memory such as a flash memory, and stores a variety of information. The storage unit 17 stores, for example, programs which are firmware, a variety of data necessary for the control unit 16 to perform various functions, and so on.

The communication unit 18 may be connected to various external devices, for example, wirelessly. In the present embodiment, the communication unit 18 performs communication with the vehicle 5 and the mobile terminals 1*x* and 1*y* which are the other remote vehicle control devices. The mobile terminal 1 may receive images for display generated by the image processing device 2 of the vehicle 5, and a variety of information (the steering angle, the shift position, the traveling velocity, obstacle information, and so on) detected by the sensor unit 51 of the vehicle 5, via the communication unit 18. The mobile terminal 1 may transmit control signals for the vehicle 5 based on operations on the operation unit 12, to the vehicle 5 via the communication unit 18. The mobile terminal 1 may perform transmission and reception of information and transfer of the control authority for the vehicle 5, in cooperation with the mobile terminals 1x and 1y, via the communication unit 18.

3. Configuration of Image Processing Device

The image processing device 2 is configured to include an image generating unit 21, a control unit 22, and a storage unit 23.

The image generating unit 21 generates images for display by processing images acquired by the imaging unit 4. In the present embodiment, the image generating unit 21 is configured as a hardware circuit capable of a variety of image processing. In the present embodiment, the image generating unit 21 generates synthetic images showing the surrounding area of the vehicle 5 as seen from virtual viewpoints, on the basis of images acquired by the on-board cameras 41 to 44 mounted on the vehicle 5. Further, the image generating unit 21 generates images for display to be displayed on the mobile terminal 1, on the basis of the synthetic images. Details of the method of generating synthetic images will be described below.

The control unit 22 is a so-called microcomputer including a CPU, a RAM, and a ROM (not shown in the drawings). The control unit 22 performs information processing and information transmission and reception on the basis of a program stored in the storage unit 23. The control unit 22 is connected to the mobile terminal 1, the vehicle control device 3, the imaging unit 4, and the sensor unit 51 by wire or wirelessly.

The control unit 22 includes an image acquiring unit 221 and an image control unit 222. The CPU performs arithmetic processing according to a program, whereby the functions of the individual components of the control unit 22 are implemented.

The image acquiring unit 221 acquires images acquired by the on-board cameras 41 to 45. In the present embodiment, the number of on-board cameras 41 to 45 is five, and the image acquiring unit 221 acquires images acquired by the individual on-board cameras 41 to 45.

The image control unit 222 controls image processing which is performed by the image generating unit 21. For example, the image control unit 222 issues instructions related to various parameters necessary to generate synthetic images and images for display, to the image generating unit 21. Also, the image control unit 222 performs control to output images for display generated by the image generating unit 21 to the mobile terminal 1. However, in this description, images for display which are related to synthetic images and are displayed on the display unit 11 of the mobile terminal 1 are also referred to simply as synthetic images.

The storage unit 23 is a non-volatile memory such as a flash memory, and stores a variety of information. The storage unit 23 stores, for example, programs which are firmware, a variety of data necessary for the image generating unit 21 to generate synthetic images and images for display. Also, the storage unit 23 stores a variety of data necessary for the image acquiring unit 221 and the image control unit 222 to perform processing.

4. Generation of Synthetic Images

Figure 3:
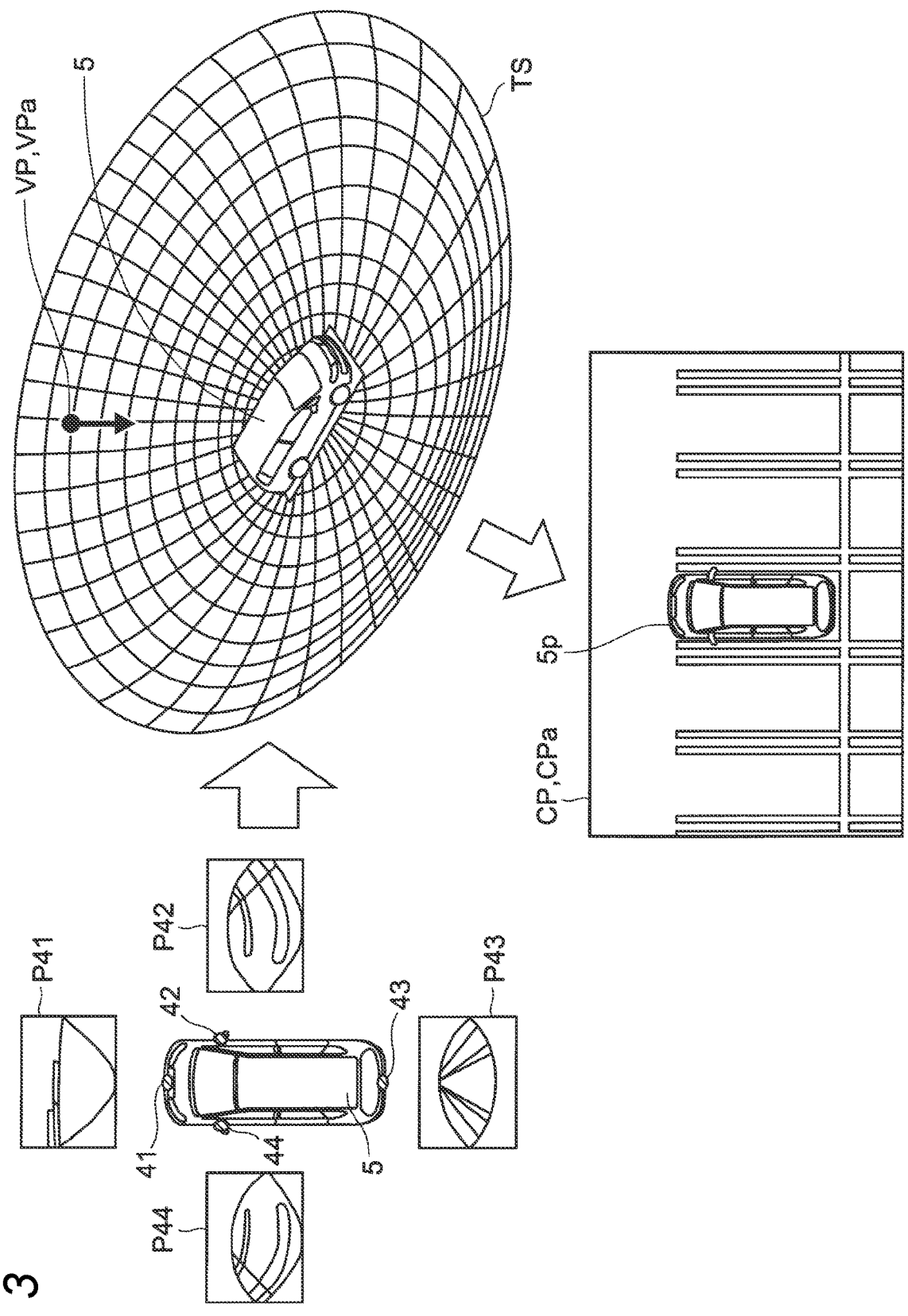
FIG. 3 is a view for explaining a method of generating synthetic images showing the surrounding area of the vehicle.

The method by which the image generating unit 21 generates synthetic images showing the condition in the surrounding area of the vehicle 5 as seen from virtual viewpoints will be described. FIG. 3 is a view for explaining the method of generating synthetic images CP showing the surrounding area of the vehicle 5.

By the front camera 41, the right side camera 42, the back camera 43, and the left side camera 44, four images P41 to P44 showing the front side, the right side, the rear side, and the left side of the vehicle 5 respectively are acquired at the same time. In the four images P41 to P44, data on all over the surrounding area of the vehicle 5 is included. The image generating unit 21 acquires the four images P41 to P44 via the image acquiring unit 221.

The image generating unit 21 projects the data included in the four images P41 to P44 (the values of the individual pixels), onto a projection plane TS which is a three-dimensional curved plane in a virtual three-dimensional space. The projection plane TS has, for example, a substantially hemispherical shape (a bowl shape), and the center thereof (a bottom part of the bowl) is determined as the position of the vehicle 5.

Onto an area of the projection plane TS on the outside of the area for the vehicle 5, the image data is projected. The correspondence relation between the positions of the individual pixels which are included in the images P41 to P44 and the positions of the individual pixels on the projection plane TS is determined in advance. Table data representing that correspondence relation is stored in the storage unit 23. The values of the individual pixels on the projection plane TS may be determined on the basis of the above-mentioned correspondence relation and the values of the individual pixels included in the images P41 to P44.

Next, the image generating unit 21 sets a virtual viewpoint VP in the three-dimensional space under the control of the image control unit 222. The virtual viewpoint VP is defined by a viewpoint position and a sight line direction. The image generating unit 21 may set a virtual viewpoint VP having an arbitrary viewpoint position and an arbitrary sight line direction, in the three-dimensional space. The image generating unit 21 extracts data projected onto an area of the projection plane TS included in the field of view as seen from the set virtual viewpoint VP, as an image. In this way, the image generating unit 21 generates synthetic images as seen from arbitrary virtual viewpoints VP.

For example, as shown in FIG. 3, in the case of assuming a virtual viewpoint VPa defined by a viewpoint position which is right above the vehicle 5 and a sight line direction which is a straight downward direction, it is possible to generate a synthetic image (a bird's eye view image) CPa showing the vehicle 5 and the surrounding area of the vehicle 5.

An image 5p of the vehicle 5 which is shown in the synthetic image CPa is prepared as data such as a bitmap and is stored in the storage unit 23, in advance. When the synthetic image CPa is generated, the data of the image 5p of the vehicle 5 having a shape according to the viewpoint position and the sight line direction defining the virtual viewpoint VP of the synthetic image is read out, and is included in the synthetic image CPa.

As described above, the image generating unit 21 may generate realistic synthetic images CPa, using the virtual three-dimensional projection plane TS.

Also, it is possible to check the surrounding area of the vehicle 5, using each synthetic image CP showing the surrounding area of the vehicle 5, generated on the basis of plural images acquired by the plural on-board cameras 41 to 44 mounted on the vehicle 5. Therefore, it is also possible to check blind areas from the position of the user, such as an area on the opposite side of the vehicle 5 screened by the vehicle 5 as seen from the position of the user.

First Example

5. Examples of Remote Vehicle Control Using Mobile Terminals

5-1. First Example

Figure 4:
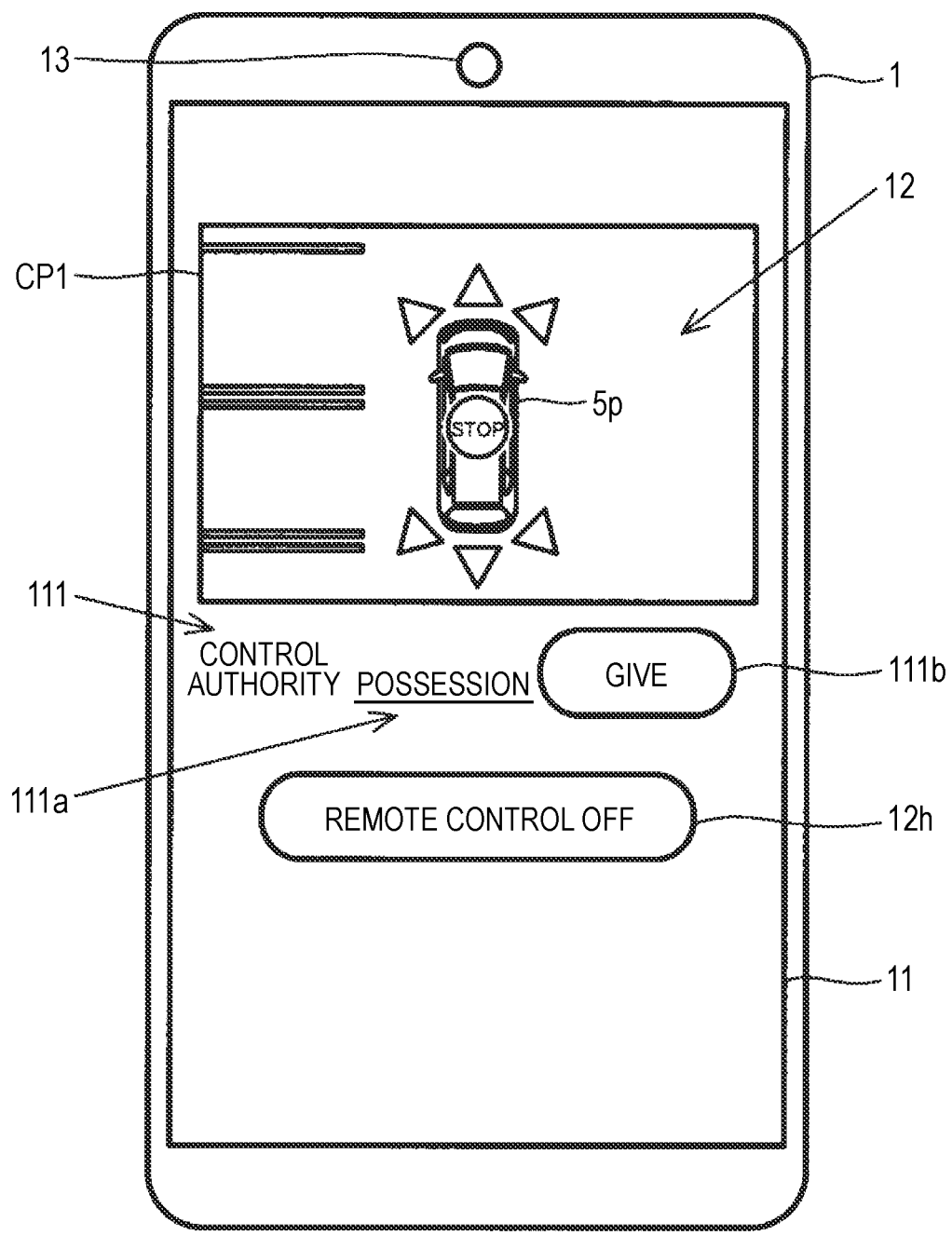
FIG. 4 is a schematic diagram illustrating a mobile terminal displaying a synthetic image according to a first example (Example 1)

The mobile terminal 1 may receive synthetic images showing the surrounding area of the vehicle 5 as seen from virtual viewpoints, generated by the image processing device 2 of the vehicle 5, via the communication unit 18. The mobile terminal 1 may display the synthetic images on the display unit 11. FIG. 4 is a schematic diagram illustrating the mobile terminal 1 displaying a synthetic image CP1 of a first example (Example 1). The synthetic image CP1 is, for example, a bird's eye view image showing the surrounding area of the vehicle 5.

Figure 5:
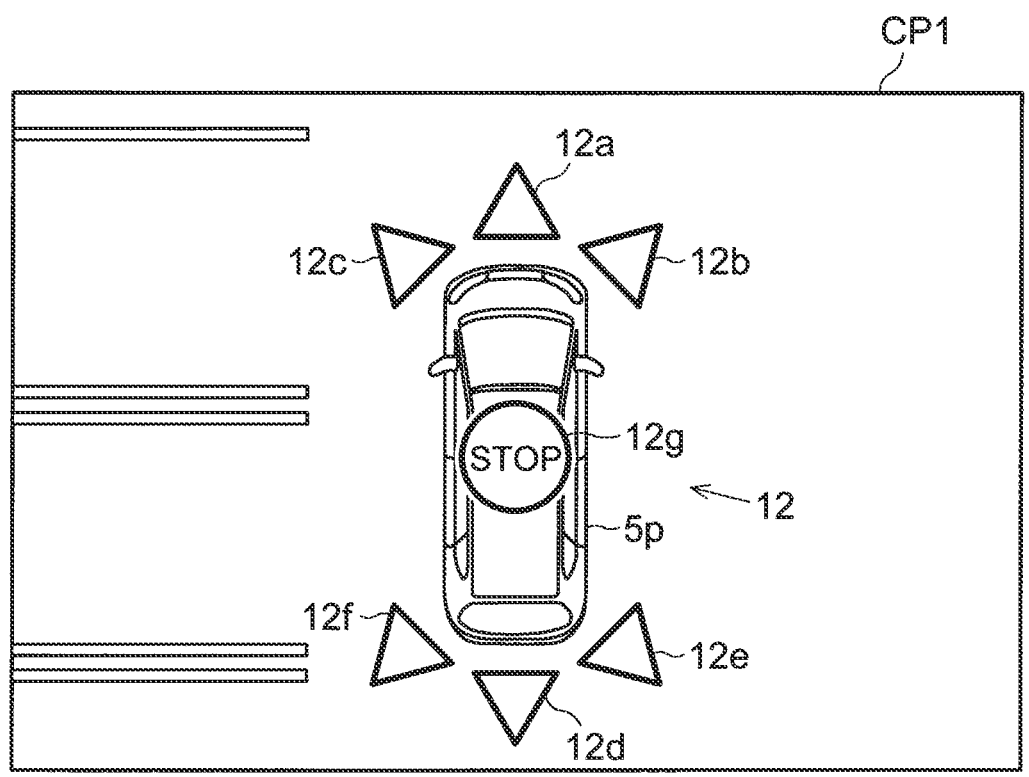
FIG. 5 is a schematic diagram illustrating a synthetic image displayed on the mobile terminal according to the first example.

FIG. 5 is a schematic diagram illustrating the bird's eye view image CP1 displayed on the mobile terminal 1 according to the first example. As shown in FIG. 5, on the occasion of remotely controlling the vehicle 5, the mobile terminal 1 displays icons and so on which are function images related to remote control on the vehicle 5, on the display unit 11. In other words, on the bird's eye view image CP1, icons and so on which are images of the operation unit 12 are superimposed. The operation unit 12 is disposed according to the position of the image 5p of the vehicle 5 on the bird's eye view image CP1.

Specifically, on the screen of the display unit 11, for example, an icon 12a related to forward traveling, an icon 12b related to the front right side, an icon 12c related to the front left side, an icon 12d related to backward traveling, an icon 12e related to the rear right side, and an icon 12f related to the rear left side are displayed so as to overlap the bird's eye view image CP1. These icons related to traveling of the vehicle 5 are disposed, for example, around the image 5p of the vehicle 5, according to positions and directions corresponding to individual traveling directions, respectively. In the present example, the icons indicating the traveling directions of the vehicle 5 are configured, for example, in a triangular shape; however, they may be configured in any other shape such as an arrow shape.

Also, a "STOP" icon 12g related to stopping of the vehicle 5 is disposed so as to overlap the image 5p of the vehicle 5. Further, outside the bird's eye view image CP1, an icon 12h for ending remote control on the vehicle 5 is displayed.

The user may arbitrarily operate the icons with fingers. The operation discriminating unit 162 discriminates the contents of operations corresponding to the icons on the basis of detection signals of the touch panel (the operation unit 12). The signal generating unit 163 generates control signals for the vehicle 5, on the basis of the operation contents corresponding to the icons. The control signals are transmitted to the vehicle 5 via the communication unit 18.

For example, if the user presses (touches) the icon 12a related to forward traveling of the vehicle 5 once, the vehicle 5 travels forward by a predetermined distance (for example, 10 cm). Also, for example, if the user presses the icon 12c related to the front left side of the vehicle 5, the vehicle 5 changes the steering angle by a predetermined angle such that the vehicle travels to the front left side. In this configuration, whenever changing the steering angle, the orientation of the image 5p of the vehicle 5 may be changed such that it is possible to easily grasp which direction the vehicle is turning to. Subsequently, if the user presses the icon 12a related to forward traveling once, the vehicle 5 travels to the front left side by a predetermined distance. However, the movement direction, traveling distance, and so on may be controlled on the basis of operations using moving which is performed on the touch panel (the operation unit 12), such as dragging and flicking.

In the case where the user wants to stop the vehicle 5 when the vehicle is traveling, if the user presses the "STOP" icon 12g related to stopping of the vehicle 5, the vehicle 5 stops. Alternatively, the vehicle 5 may travel only when the user is pressing the icon 12a related to forward traveling or the icon 12d related to backward traveling, and if the user removes the finger from the icon 12a or the icon 12d, the vehicle 5 may stop.

Further, the user may perform operations such as an operation for changing the viewpoint position, the sight line direction, and the zoom related to a synthetic image displayed on the display unit 11, via the operation unit 12.

During remote control, obstacles around the vehicle 5, such as people, animals, vehicles, and other objects, are detected by the sensor unit 51 of the vehicle 5. If the sensor unit 51 detects any obstacle, a detection signal is transmitted to the vehicle control device 3, and the vehicle control device 3 automatically stops the vehicle 5.

Figure 6:
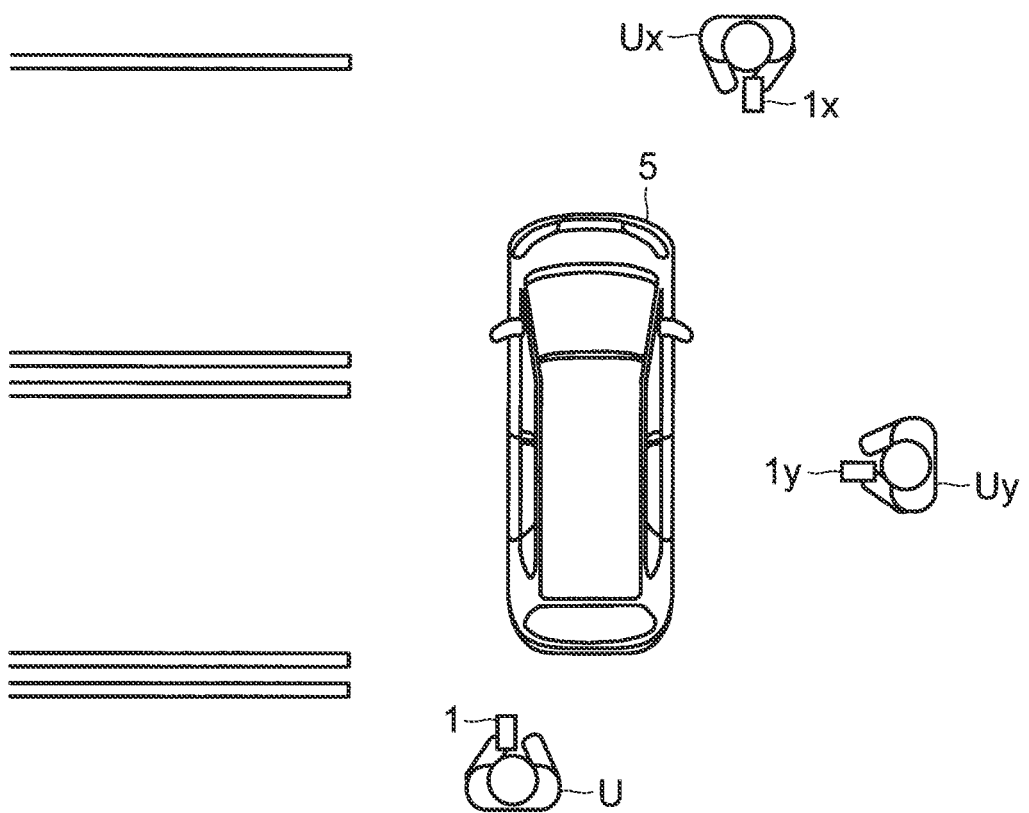
FIG. 6 is a view for explaining a method of remotely controlling the vehicle by plural mobile terminals.

Also, as shown in FIG. 6, the vehicle 5 may be remotely controlled, for example, by each of the plural mobile terminals 1, 1x, and 1y which is remote vehicle control devices. FIG. 6 is a view for explaining a method of remotely controlling the vehicle 5 by the plural mobile terminals 1, 1x, and 1y. Users U, Ux, and Uy have the mobile terminals 1, 1x, and 1y, respectively.

Figure 7:
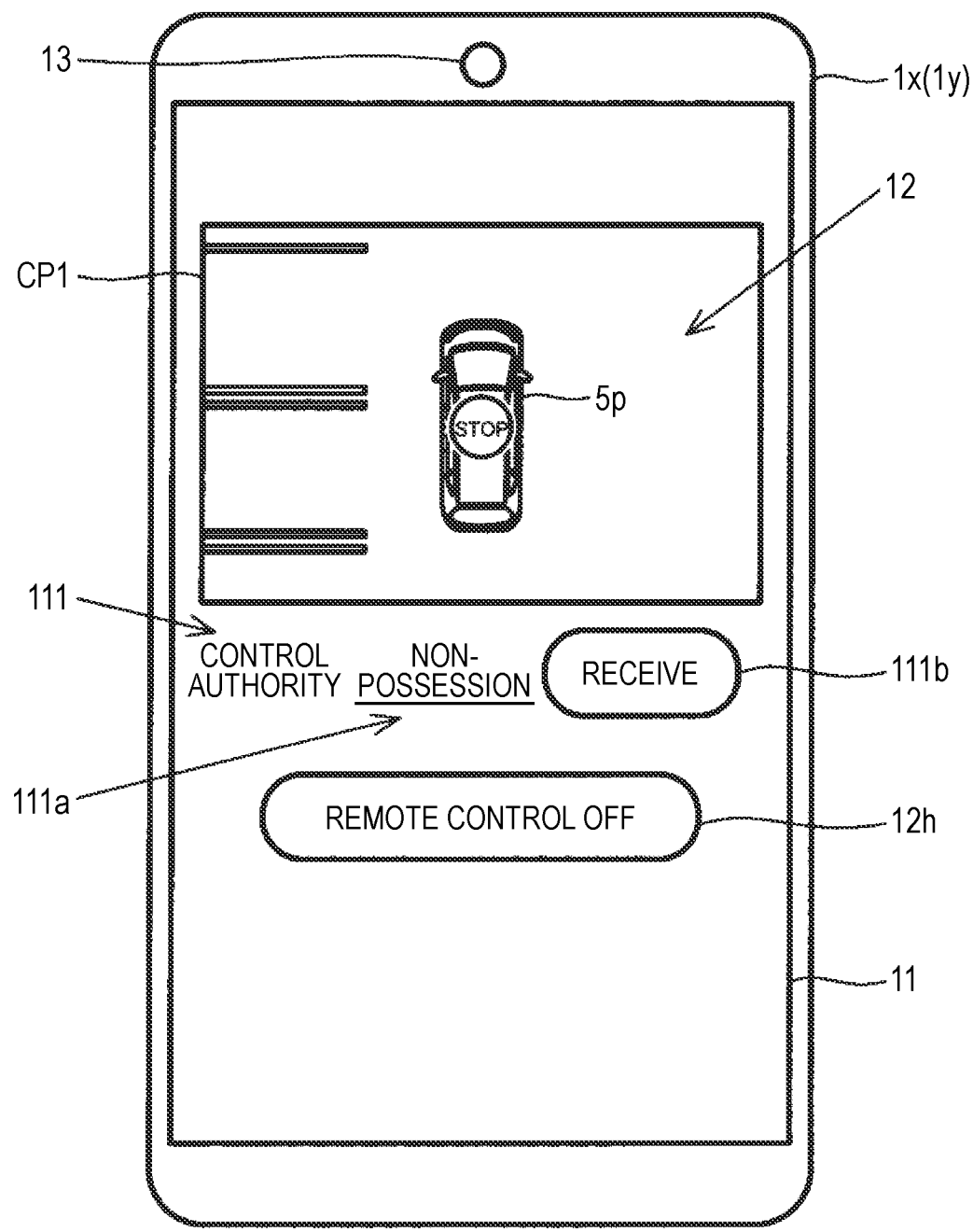
FIG. 7 is a schematic diagram illustrating the mobile terminal displaying a synthetic image according to the first example (Example 2)

The mobile terminal 1 belonging to the user U may perform transfer of the control authority for the vehicle 5, in cooperation with the mobile terminals 1x and 1y via the communication unit 18. Similarly, each of the mobile terminals 1x and 1y belonging to the users Ux and Uy may perform transfer of the control authority for the vehicle 5, in cooperation with the other mobile terminals. On the occasion of remotely controlling the vehicle 5, each of the mobile terminals 1x and 1y may display a synthetic image CP1 on the display unit 11. FIG. 7 is a schematic diagram illustrating the mobile terminal 1x or 1y displaying a synthetic image CP1 according to the first example (Example 2).

As shown in FIG. 4 and FIG. 7, each of the mobile terminals 1, 1x, and 1y may display an image 111 as information related to the control authority for the vehicle 5, on the display unit 11. The image 111 which is information related to the control authority for the vehicle 5 includes a control-authority possession/non-possession image 111a and a control-authority transfer key 111b. Herein, a configuration in which all of the plural types of control authority related to traveling of the vehicle 5, such as the control authority for the accelerator and the control authority for the steering wheel are given to any one of the mobile terminal 1 and the other mobile terminals 1x and 1y will be described.

The control-authority possession/non-possession image 111a is an image representing possession or non-possession of the control authority for the vehicle 5. For example, in the case where the mobile terminal 1 has the control authority for the vehicle 5, as shown in FIG. 4, as the control-authority possession/non-possession image 111a, "POSSESSION" is displayed. On the synthetic image CP1 of the mobile terminal 1, the icons (the operation unit 12) related to traveling of the vehicle 5 are displayed. In each of the mobile terminals 1x and 1y which do not have the control authority for the vehicle 5, as shown in FIG. 7, as the control-authority possession/non-possession image 111a, "NON-POSSES- SION" is displayed. On the synthetic image CP1 of each of the mobile terminals 1x and 1y, the icons (the operation unit 12) related to traveling of the vehicle 5 are not displayed. In other words, the authority managing unit 164 of each of the mobile terminal 1 and the other mobile terminals 1x and 1y handles some of the plural types of control authority for the vehicle 5, i.e. the types of control authority related to traveling of the vehicle 5, as one. For example, even in the case where the control authority related to traveling of the vehicle 5 is classified into the control authority for the accelerator, the control authority for the steering wheel, and so on, it is preferable to handle the plural types of control authority as one.

The control-authority transfer key 111b is a key for performing transfer of the control authority for the vehicle 5 between the mobile terminal 1 and the other mobile terminals 1x and 1y. For example, in the case where the mobile terminal 1 has the control authority for the vehicle 5, as shown in FIG. 4, as the control-authority transfer key 111b, "GIVE" is displayed. On the mobile terminal 1, it is possible to give the control authority for the vehicle 5 to any one of the mobile terminals 1x and 1y which do not have the control authority for the vehicle 5, by operating the control-authority transfer key 111b having "GIVE" thereon. In each of the mobile terminals 1x and 1y which do not have the control authority for the vehicle 5, as shown in FIG. 7, as the control-authority transfer key 111b, "RECEIVE" is displayed. On each of the mobile terminals 1x and 1y, it is possible to receive the control authority for the vehicle 5 from the mobile terminal 1 having the control authority for the vehicle 5, by operating the control-authority transfer key 111b having "RECEIVE" thereon. In this case, with respect to transfer of the control authority, it is desirable to make it possible to perform communication among the users U, Ux, and Uy, such as calling each other, confirming for each other using software of the individual mobile terminals, and so on.

Figure 8:
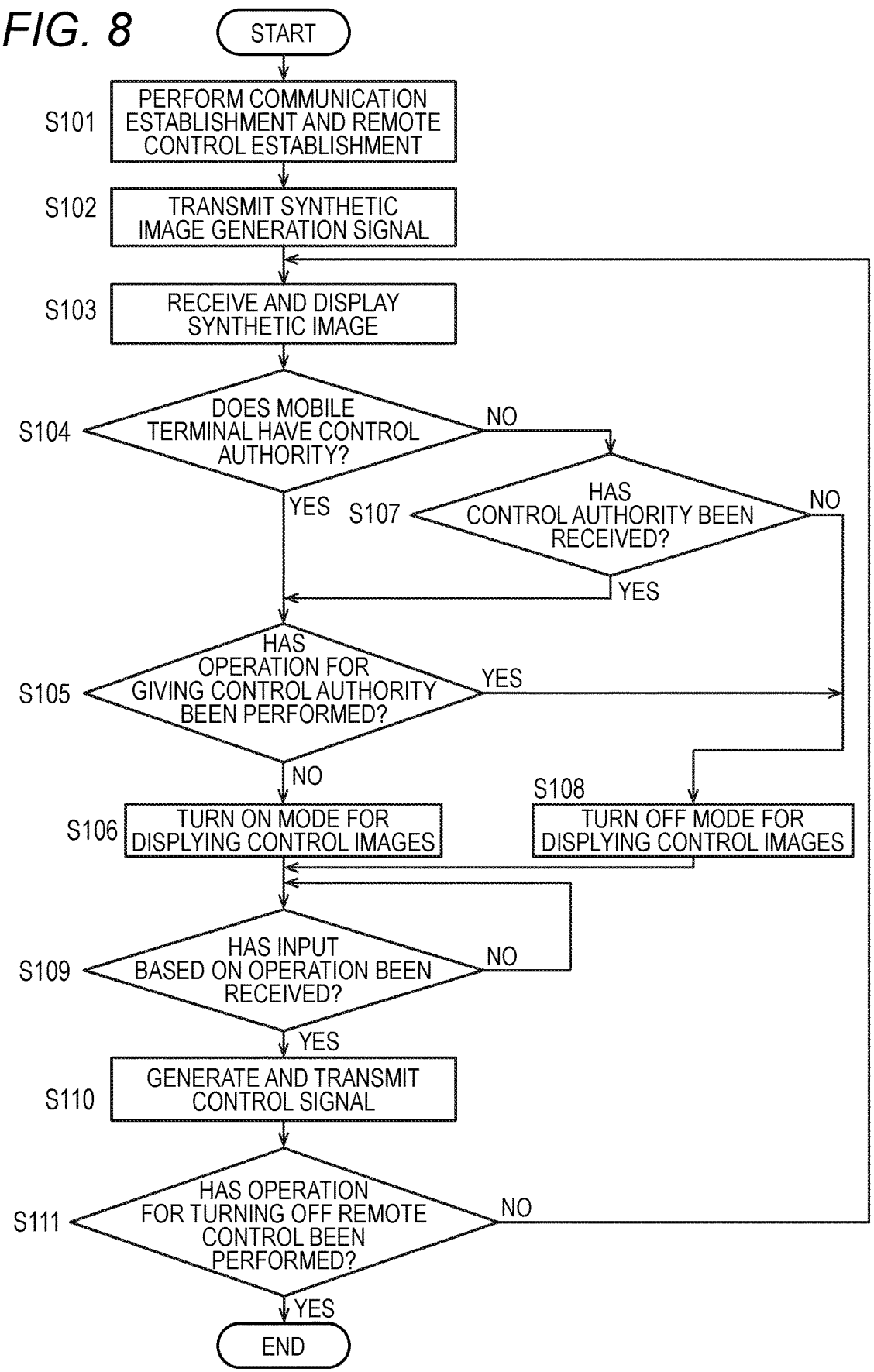
FIG. 8 is a flow chart illustrating an example of the flow of processing of the mobile terminal related to remote vehicle control according to the first example.
Figure 9:
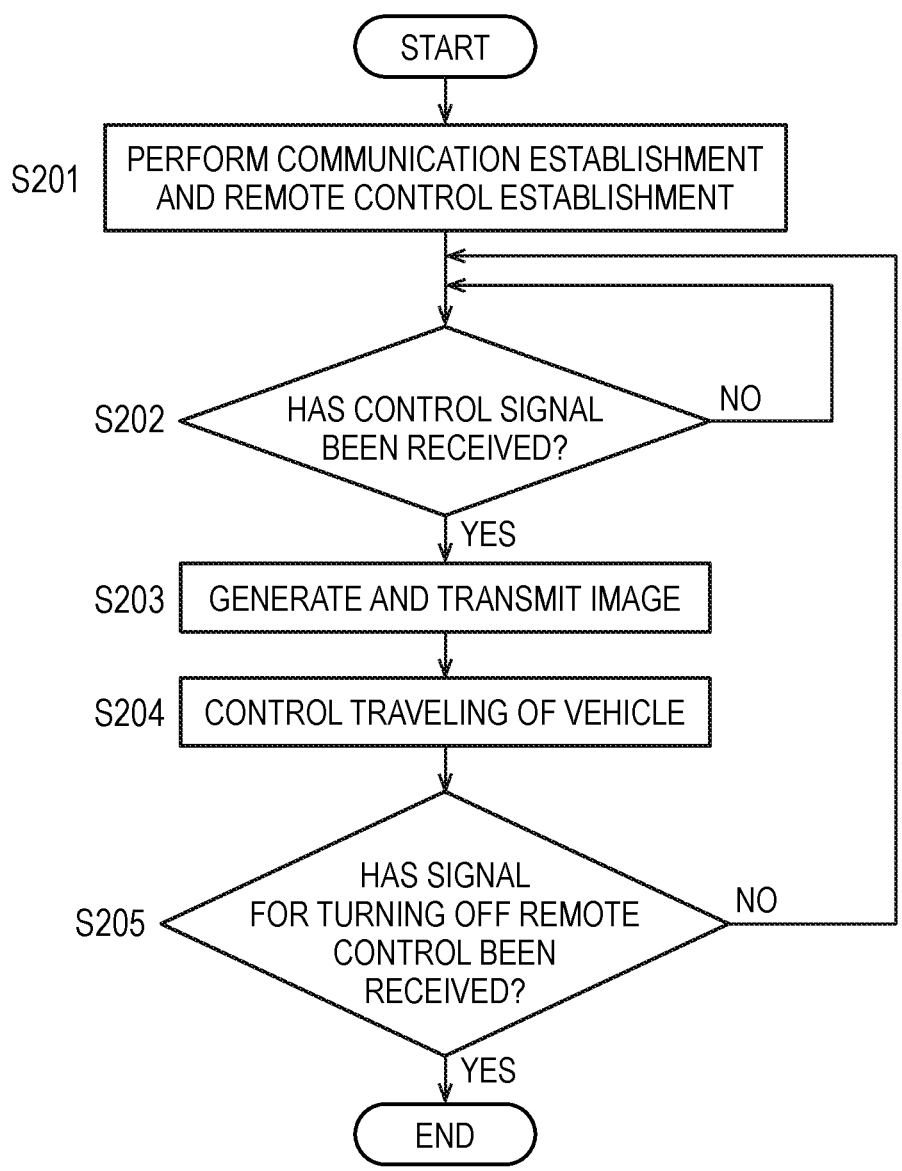
FIG. 9 is a flow chart illustrating another example of the flow of processing of the mobile terminal related to remote vehicle control according to the first example.

FIG. 8 is a flow chart illustrating an example of the flow of processing of the mobile terminal 1 related to remote vehicle control according to the first example. FIG. 9 is a flow chart illustrating another example of the flow of processing of the mobile terminal 1 related to remote vehicle control according to the first example. The processing which is related to remote control on the vehicle 5 and is performed by the mobile terminal 1 according to the first example will be described with reference to the processing flows of FIG. 8 and FIG. 9.

However, herein, a configuration in which all of the plural types of control authority related to traveling of the vehicle 5, such as the control authority for the accelerator and the control authority for the steering wheel are given to any one of the mobile terminal 1 and the other mobile terminals 1x and 1y will be described.

For example, if the mobile terminal 1 is operated by the user, and receives a remote control start instruction from the operation unit 12, the processing of the mobile terminal 1 related to remote control on the vehicle 5 is started ("START" of FIG. 8). Remote control on the vehicle 5 is started when the vehicle 5 is stopped.

Subsequently, the mobile terminal 1 performs a communication establishment process and a remote control establishment process in cooperation with the vehicle 5 (STEP S101). At this time, even in the vehicle 5, processing related to remote control is started ("START" of FIG. 9), and the communication establishment process and the remote control establishment process are performed in cooperation with the mobile terminal 1 (STEP S201). In these steps, for example, a process of matching the mobile terminal 1 and the vehicle 5, a control permission process, and so on are performed. In the control permission process, for example, an authentication process on an ID, a password, and so on is performed.

Next, the mobile terminal 1 transmits a control signal relates to generation of synthetic images showing the surrounding area of the vehicle 5 as seen from a virtual viewpoint to the image processing device 2 of the vehicle 5 (STEP S102).

In the vehicle 5, whether any control signal related to remote control on the vehicle 5 has been received is determined (STEP S202 of FIG. 9). In the case where the vehicle 5 has received a control signal ("Yes" in STEP S202), for example, if the control signal is a signal related to image generation, the image processing device 2 generates an image on the basis of the control signal, and transmits the image to the mobile terminal 1 (STEP S203). The image processing device 2 acquires plural images of the surrounding area of the vehicle 5 from the individual on-board cameras 41 to 44, respectively. The image generating unit 21 generates a synthetic image showing the surrounding area of the vehicle 5 as seen the virtual viewpoint, on the basis of the plural images of the surrounding area of the vehicle 5.

Next, the mobile terminal 1 receives the synthetic image CP1 from the image processing device 2, and displays the synthetic image CP1 on the display unit 11 (STEP S103 of FIG. 8).

Next, the mobile terminal 1 determines whether it has the control authority for the vehicle 5, such as the control authority for the accelerator and the control authority for the steering wheel (STEP S104). In the case where the mobile terminal 1 has the control authority for the vehicle 5 ("Yes" in STEP S104), whether an operation for giving the control authority to one of the other mobile terminals 1x and 1y and so on has been performed is determined (STEP S105).

In the case where the mobile terminal 1 has the control authority for the vehicle 5 ("No" in STEP S105), the mobile terminal 1 turns on a mode for displaying control images related to traveling of the vehicle 5 on the display unit 11 (STEP S106). In other words, the mobile terminal 1 displays the icons and so on (the operation unit 12) which are function images related to traveling of the vehicle 5, so as to overlap the synthetic image CP1. As a result, the user may arbitrarily operate the icons for remote control with fingers. At this time, as the control-authority possession/non-possession image 111a, "POSSESSION" is displayed, and the control-authority transfer key 111b, "GIVE" is displayed.

In the case where the mobile terminal 1 does not have the control authority for the vehicle 5 ("No" in STEP S104), whether it has received the control authority for the vehicle 5 from one of the other mobile terminals 1x and 1y and so on is determined (STEP S107). In the case where the mobile terminal 1 has received the control authority for the vehicle 5 from one of the other mobile terminals 1x and 1y and so on ("Yes" in STEP S107), it determines whether an operation for giving the control authority to one of the other mobile terminals 1x and 1y and so on has been performed is determined (STEP S105).

In the case where the mobile terminal 1 has given the control authority for the vehicle 5 to one of the other mobile terminals 1x and 1y and so on ("Yes" in STEP S105), or in the case where the mobile terminal 1 has not had the control authority from the beginning and has not received the control authority from any one of the other mobile terminals 1x and 1y and so on ("No" in STEP S107), it turns off the mode for displaying the control images related to traveling of the vehicle 5 on the display unit 11 (STEP S108). In other words, the mobile terminal 1 does not display the icons and so on (the operation unit 12) which are function images related to traveling of the vehicle 5, so as to overlap the synthetic image CP1. At this time, as the control-authority possession/non-possession image 111*a*, "NON-POSSESSION" is displayed, and the control-authority transfer key 111*b*, "RECEIVE" is displayed.

Next, the mobile terminal 1 determines whether an input based on a user's operation on the operation unit 12 has been received (STEP S109). Examples of a user's operation include an operation for performing remote operation related to traveling of the vehicle 5, an operation for changing the viewpoint position, the sight line direction, or the zoom related to the synthetic image CP1, and so on.

In the case where an input based on an operation on the operation unit 12 has been received is determined ("Yes" in STEP S109), the mobile terminal 1 generates a control signal for the vehicle 5 based on the operation on the operation unit 12 by the signal generating unit 163, and transmits the control signal to the vehicle 5 (STEP S110). In this way, the user may perform remote control on the vehicle 5.

In the vehicle 5, whether any control signal related to remote control on the vehicle 5 has been received is determined (STEP S202 of FIG. 9). In the case where the vehicle 5 has received a control signal ("Yes" in STEP S202), for example, if the control signal is a signal related to image generation, the image processing device 2 generates an image on the basis of the control signal, and transmits the image to the mobile terminal 1 (STEP S203). If the control signal received by the vehicle 5 is a signal related to traveling control, the vehicle control device 3 controls traveling of the vehicle 5 on the basis of the control signal (STEP S204).

Next, the mobile terminal 1 determines whether an operation for turning off remote control on the vehicle 5 has been performed by the user (STEP S111). The user may end remote control on the vehicle 5 by operating the icon 12*h* for ending remote control on the vehicle 5. In the case where an operation for turning off remote control has not been performed ("No" in STEP S111), the mobile terminal 1 returns to STEP S103, and carries on receiving and displaying synthetic images CP1.

In the case where an operation for turning off remote control has been performed ("Yes" in STEP S111), the processing flow of the mobile terminal 1 shown in FIG. 8 is ended.

In the vehicle 5, whether a control signal for turning off remote control on the vehicle 5 has been received is determined (STEP S205 of FIG. 9). In the case where a control signal for turning off remote control has not been received ("No" in STEP S205), the vehicle returns to step 202, and carries on determining whether a control signal related to remote control on the vehicle 5 has been received.

In the case where a control signal for turning off remote control has been received ("Yes" in STEP S205), the processing flow of the vehicle 5 shown in FIG. 9 is ended.

As described above, the mobile terminal 1 of the present example which is a remote vehicle control device displays synthetic images CP1 showing the surrounding area of the vehicle 5 as seen from virtual viewpoints, on the display unit 11. The communication unit 18 transmits control signals for the vehicle 5, to the vehicle 5. The authority managing unit 164 performs transfer of the control authority for the vehicle 5, in cooperation with the other mobile terminals 1*x* and 1*y* via the communication unit 18. According to this configuration, people may perform remote control on the vehicle 5 while checking the surrounding area of the vehicle 5 on synthetic images CP1. For example, in the case where a blind area occurs, the user may hand over the control authority for the vehicle 5 to another person easy to check the condition in the blind area. In other words, it is possible to improve convenience and operability in remote control on the vehicle 5.

Further, the communication unit 18 receives the synthetic images CP1 generated in the vehicle 5, from the vehicle 5. According to this configuration, it is possible to reduce the load of the mobile terminal 1. Therefore, it is possible to perform remote control using the mobile terminal 1, quickly and stably, and it is possible to improve convenience and operability in remote control on the vehicle 5.

Also, control signals for the vehicle 5 include signals related to control on the viewpoint positions and sight line directions of synthetic images CP1. According to this configuration, the user may see synthetic images CP1 based on various arbitrary viewpoint positions and various arbitrary sight line directions. Therefore, it is possible to improve convenience and operability in remote control on the vehicle 5.

Further, the authority managing unit 164 separately manages each of the plural types of control authority for the vehicle 5, between the mobile terminal 1 and the other mobile terminals 1*x* and 1*y*. According to this configuration, people may control, for example, the accelerator, the steering wheel, and so on, respectively. In other words, for example, according to the arrangement, abilities, and so on of the users, each of the users may take charge of a part of the control on the vehicle 5. Therefore, it is possible to improve convenience and operability in remote control on the vehicle 5.

Also, the authority managing unit 164 of each of the mobile terminal 1 and the other mobile terminals 1*x* and 1*y* handles some of the plural types of control authority for the vehicle 5, for example, the types of control authority related to traveling of the vehicle 5, as one. According to this configuration, it is possible to prevent control signals related to traveling of the vehicle 5 from being transmitted from the plural individual mobile terminals 1, 1*x*, and 1*y* to the vehicle 5 at the same time. Therefore, safety during remote control improves, and it is possible to improve convenience in remote control on the vehicle 5.

Further, as shown in FIG. 4 and FIG. 7, each of the mobile terminals 1, 1*x*, and 1*y* always displays the "STOP" icon 12*g* related to stopping of the vehicle 5. Each of the users U, Ux, and Uy may stop the vehicle 5, regardless of whether the user has the control authority related to traveling of the vehicle 5, by operating the icon 12*g*. In other words, the authority managing units 164 of the mobile terminal 1 and the other mobile terminals 1*x* and 1*y* share the control authority related to stopping of the vehicle 5 which is one of the plural types of control authority for the vehicle 5. According to this configuration, each user may stop the vehicle 5 during an emergency even in the case where the user has handed over the control authority for the vehicle 5 to another person. Therefore, safety during remote control improves, and it is possible to further more improve convenience in remote control on the vehicle 5.

Also, each of the mobile terminals 1, 1*x*, and 1*y* may display display images of the display units 11 of the other mobile terminals, on its own display unit 11. In other words, the communication unit 18 of each of the mobile terminals 1, 1*x*, and 1*y* receives a display image of the display unit 11 of another mobile terminal from the another mobile terminal. Subsequently, the display unit 11 displays the received display image. Each of display images of the mobile terminals 1, 1x, and 1y is accompanied by an identification number representing which terminal the corresponding image belongs to, and each mobile terminal selects images to be displayed, on the basis of their identification numbers. According to this configuration, for example, each of the mobile terminals 1, 1x, and 1y may switch between an image of a mobile terminal which has the control authority for the vehicle 5 and an image of a mobile terminal which does not have the control authority for the vehicle 5, by a single touch. In this case, the user may check the condition of the vehicle 5 from various positions and various angles. Therefore, it is possible to further more improve convenience in remote control on the vehicle 5.

Further, the storage unit 17 of the mobile terminal 1 may save synthetic images CP1 displayed on the display unit 11. According to this configuration, after remote control is performed on the vehicle 5, the user may check the condition at that time, again. Therefore, it is possible to improve techniques related to remote control on the vehicle 5. Therefore, it is possible to further more improve convenience and operability in remote control on the vehicle 5.

Second Example 5-2. Second Example

Figure 10:
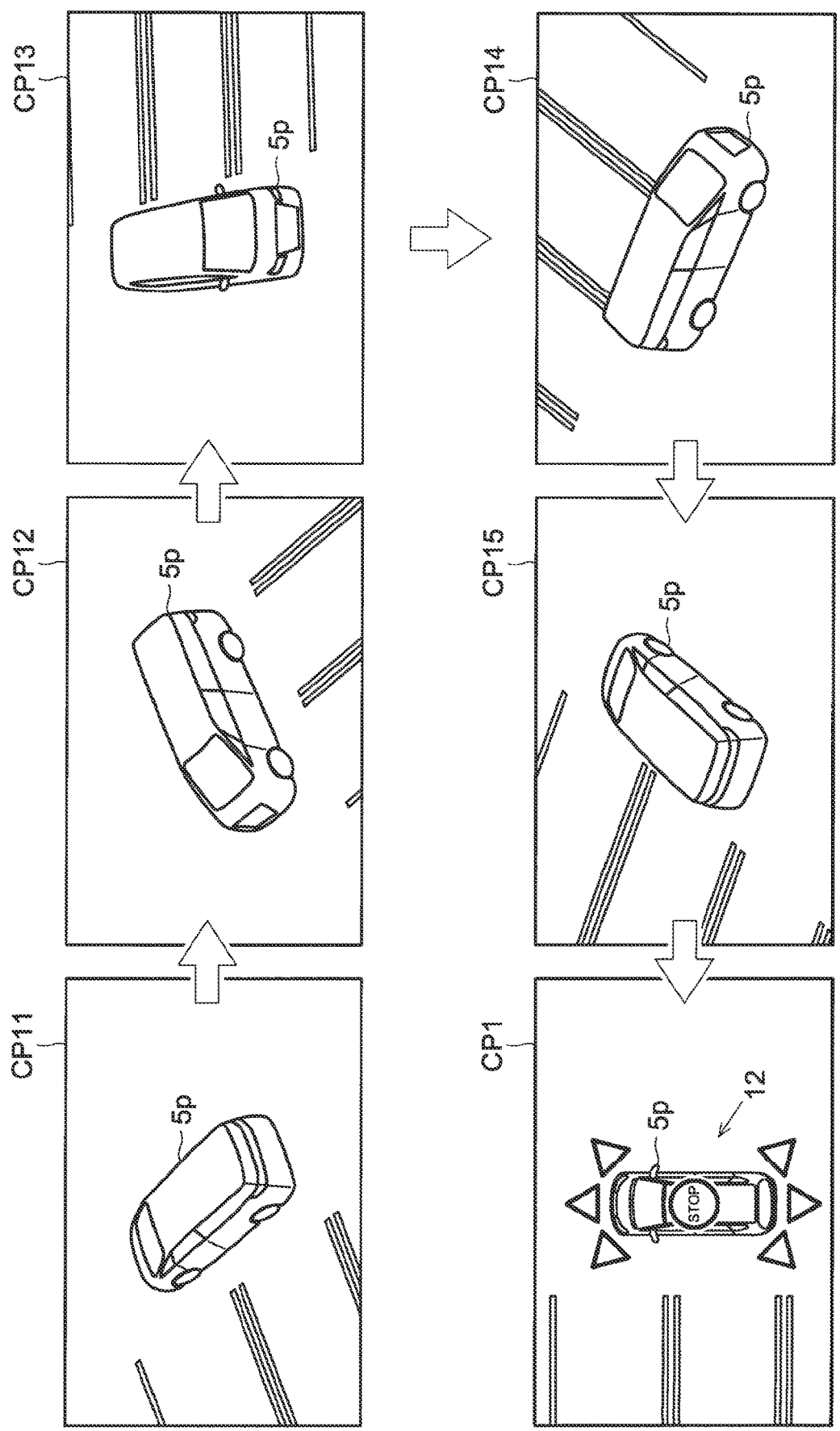
FIG. 10 is a schematic diagram illustrating synthetic images which are consecutively displayed on the mobile terminal according to a second example.

FIG. 10 is a schematic diagram illustrating synthetic images which are consecutively displayed on the mobile terminal 1 of a second example. In the mobile terminal 1 of the second example, the display unit 11 consecutively displays synthetic images CP11 to C15 along the circumference of the surrounding area of the vehicle 5, at the beginning of synthetic image display.

For example, when remote control on the vehicle 5 is started, the display unit 11 displays the synthetic image CP11 shown in FIG. 10, first. The synthetic image CP11 is, for example, an image of the surrounding area of the vehicle 5 as seen from a viewpoint which is on the left side behind the vehicle 5 and is above the vehicle. Subsequently, the display unit 11 displays, for example, the synthetic image CP12 of the surrounding area of the vehicle 5 as seen from a viewpoint which is on the left side in front of the vehicle 5 and is above the vehicle. Further, the display unit 11 sequentially displays, for example, the synthetic image CP13 of the surrounding area of the vehicle 5 as seen from a viewpoint which is almost directly in front of the vehicle 5 and is above the vehicle, the synthetic image CP14 of the surrounding area of the vehicle 5 as seen from a viewpoint which is on the right side in front of the vehicle 5 and is above the vehicle, and the synthetic image CP15 of the surrounding area of the vehicle 5 as seen from a viewpoint which is on the right side behind the vehicle 5 and is above the vehicle. Finally, the display unit 11 displays a synthetic image CP1 which is a bird's eye view image showing the surrounding area of the vehicle 5. Further, on the synthetic image CP1, the icons and so on which are images of the operation unit 12 are superimposed.

In the present embodiment, the five synthetic images CP11 to C15 are acquired as synthetic images along the circumference of the surrounding area of the vehicle 5. However, the number of synthetic images along the circumference of the surrounding area of the vehicle 5 is not limited to five, and may be less or greater than five. Also, in the present embodiment, the synthetic images CP11 to C15 along the circumference of the surrounding area of the vehicle 5 are displayed clockwise with respect to an image 5p of the vehicle 5 included in the synthetic image CP1; however, they may be displayed counterclockwise.

According to the configuration of the mobile terminal 1 of the present example, at the beginning of display of synthetic images CP1, i.e. when remote control on the vehicle 5 is started, it is possible to easily check the condition along the circumference of the surrounding area of the vehicle 5. Therefore, it is possible to improve convenience and operability in remote control on the vehicle 5.

Third Example 5-3. Third Example

Figure 11:
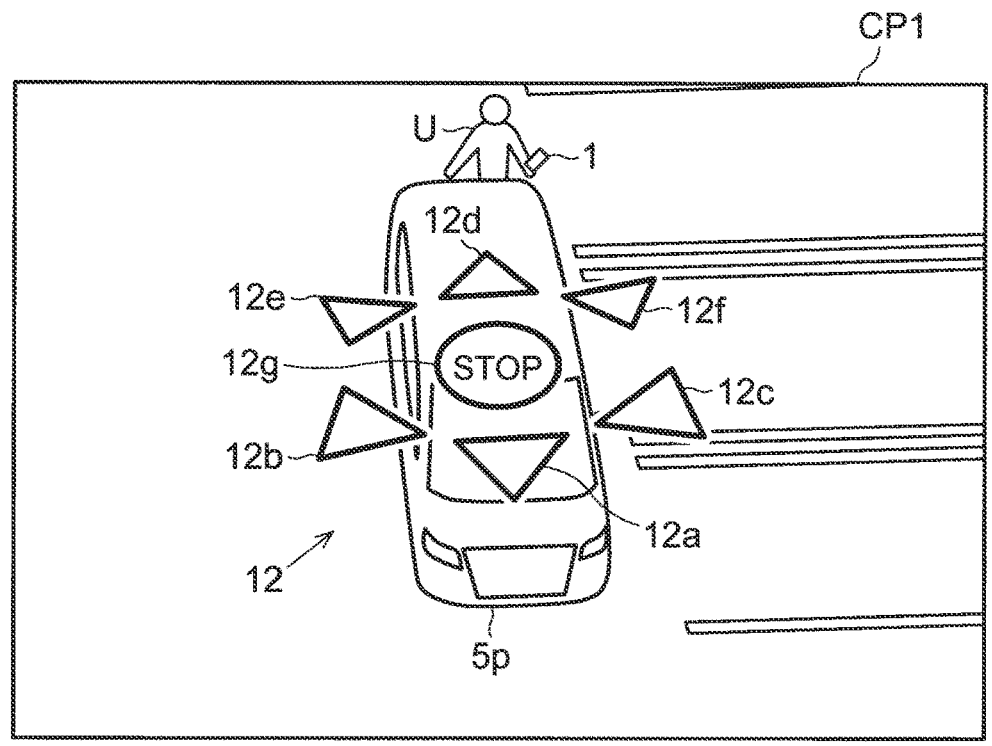
FIG. 11 is a schematic diagram illustrating a synthetic image displayed on a mobile terminal according to a third example (Example 1)

FIG. 11 is a schematic diagram illustrating a synthetic image CP1 displayed on the mobile terminal 1 of a third example (Example 1). In the mobile terminal 1 of the third example, at the beginning of synthetic image display, the display unit 11 displays a synthetic image CP1 of the vehicle 5 as seen from the opposite side of the vehicle to the mobile terminal 1.

As shown in FIG. 11, the user U carries the mobile terminal 1, and stands, for example, behind the vehicle 5. Therefore, for example, when remote control on the vehicle 5 is started, the display unit 11 displays the synthetic image CP1 shown in FIG. 11. The synthetic image CP1 is an image of the surrounding area of the vehicle 5 as seen from the opposite side of the vehicle to the location of the user U carrying the mobile terminal 1, i.e. an image of the surrounding area of the vehicle 5 as seen from a viewpoint which is almost directly in front of the vehicle 5 and is above the vehicle.

According to this configuration, at the beginning of display of synthetic images CP1, i.e. when remote control on the vehicle 5 is started, the user U may easily check the conditions in blind areas. Therefore, it is possible to improve convenience and operability in remote control on the vehicle 5.

Also, as described in the second example (see FIG. 10), after the synthetic images CP11 to C15 along the circumference of the surrounding area of the vehicle 5 are consecutively displayed, finally, the synthetic image CP1 (FIG. 11) of the vehicle 5 as seen from the opposite side of the vehicle to the location of the mobile terminal 1 may be displayed on the display unit 11.

Figure 12:
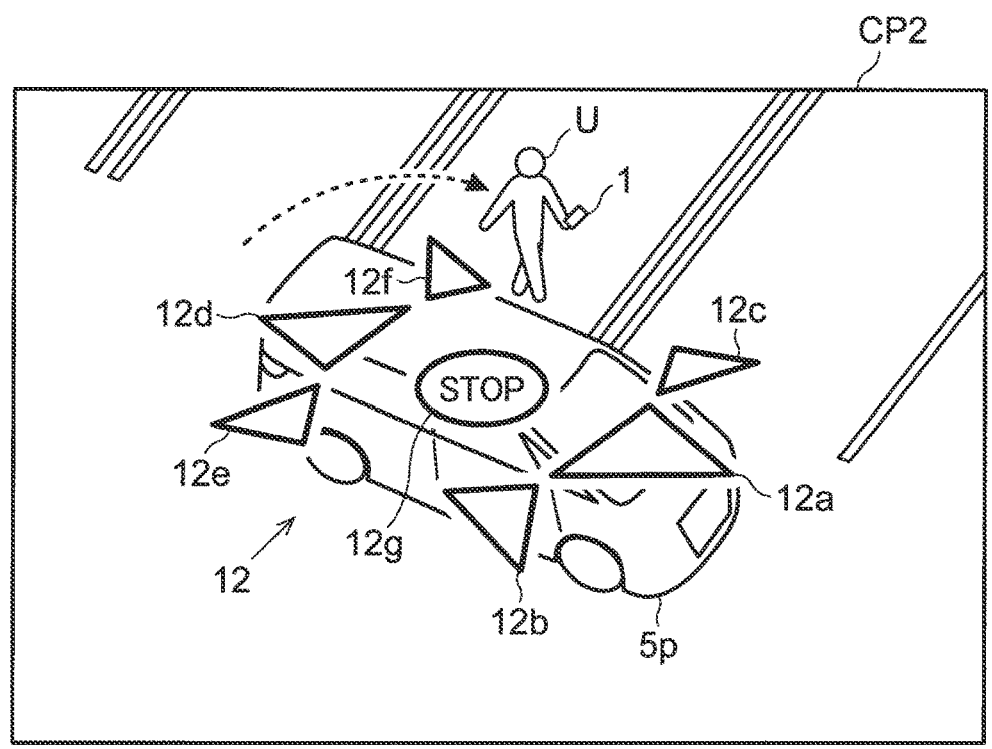
FIG. 12 is a schematic diagram illustrating a synthetic image displayed on the mobile terminal according to the third example (Example 2)

Then, as the mobile terminal 1 moves, the display unit 11 displays synthetic images based on different viewpoint positions and different sight line directions. FIG. 12 is a schematic diagram illustrating a synthetic image CP2 displayed on the mobile terminal 1 according to the third example (Example 2).

If the user U standing behind the vehicle 5 as shown in FIG. 11 moves, for example, to the left side of the vehicle 5, the display unit 11 displays the synthetic image CP2 of the surrounding area of the vehicle 5 as seen from the right side of the vehicle 5, as shown in FIG. 12. In other words, with respect to the synthetic image CP1 shown in FIG. 11, as the user U carrying the mobile terminal 1 moves, the display unit 11 displays synthetic images CP2 based on viewpoint positions and sight line directions different from those of the synthetic image CP1. Alternatively, synthetic images showing stages between the synthetic image CP1 and the synthetic image CP2 may be consecutively displayed on the display unit 11.

According to this configuration, the user U carrying the mobile terminal 1 may always check the conditions in blind areas varying with movement. Therefore, it is possible to improve convenience and operability in remote control on the vehicle 5.

Fourth Example 5-4. Fourth Example

Figure 13:
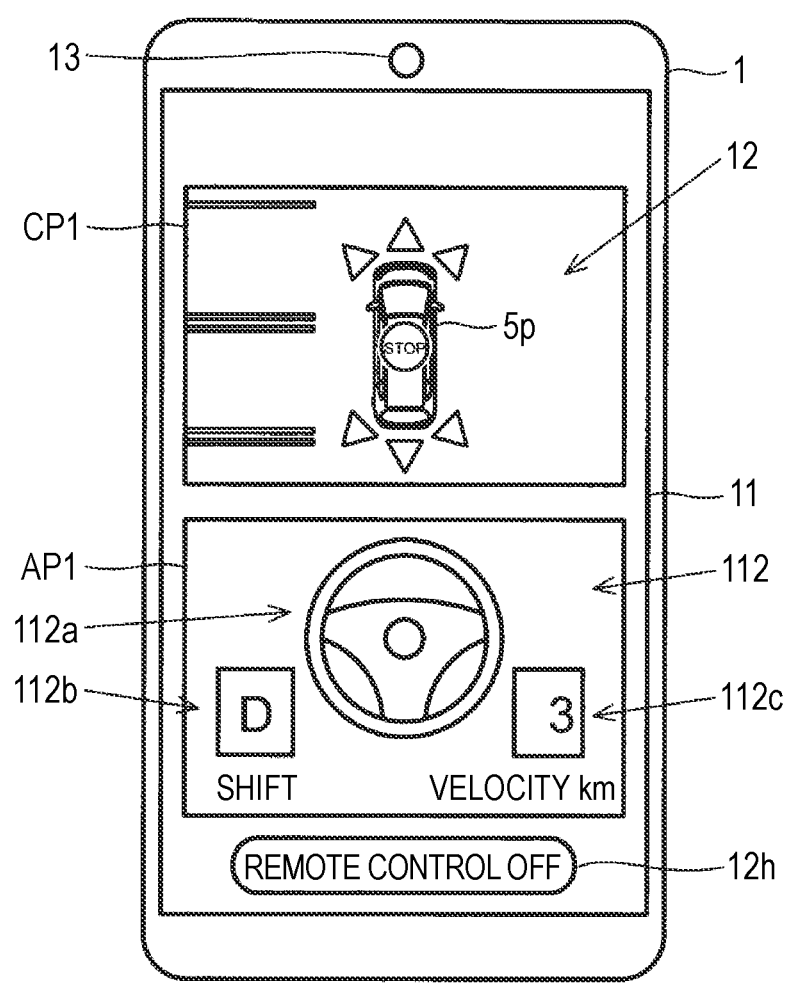
FIG. 13 is a schematic diagram illustrating a mobile terminal displaying a synthetic image and an auxiliary image according to a fourth example.

FIG. 13 is a schematic diagram illustrating the mobile terminal 1 displaying a synthetic image CP1 and an auxiliary image AP1 according to a fourth example. The mobile terminal 1 of the fourth example displays the plural icons related to remote control on the vehicle 5, as the operation unit 12, on the screen of the display unit 11, so as to overlap the synthetic image CP1.

Further, the display unit 11 of the mobile terminal 1 displays the auxiliary image AP1 below the synthetic image CP1. However, the arrangement of the synthetic image CP1 and the auxiliary image AP1 in the vertical direction may be changed. The display unit 11 displays an image 112 of information related to the controlled state of the vehicle 5, as the auxiliary image AP1. To this end the communication unit 18 receives the information related to the controlled state of the vehicle 5, from the vehicle 5. The image 112 of the information related to the controlled state of the vehicle 5 includes, for example, a steering wheel image 112a, a shift image 112b, and a traveling velocity image 112c.

The steering wheel image 112a is an image showing the rotation angle of the steering wheel of the actual vehicle 5. The steering wheel image 112a rotates on the central axis with rotation of the steering wheel of the vehicle 5 controlled by the operation unit 12. The shift image 112b is an image showing the controlled position of the shift lever of the transmission of the actual vehicle 5. The traveling velocity image 112c is an image showing the traveling velocity of the actual vehicle 5.

According to the configuration of the mobile terminal 1 of the present example, it is possible to check the controlled state of the actual vehicle 5, such as the steering wheel, on the display unit 11 of the mobile terminal 1. For example, it is possible to easily check how much the steering wheel has rotated, and what position the shift is in, and what the traveling velocity is. Therefore, it is possible to further improve convenience and operability in remote control on the vehicle 5.

However, the information related to the controlled state of the vehicle 5 is not limited to the information related to the steering wheel, the shift position, and the traveling velocity, and any other information, for example, information on the tachometer, the fuel gauge, the water temperature gauge, the distance meter, and so on may be used and displayed. Also, the information related to the controlled state of the vehicle 5 may be saved together with the synthetic image CP1 displayed on the display unit 11, in the storage unit 17. In this case, after remote control is performed on the vehicle 5, the user may check the detailed condition at that time, again.

Fifth Example 5-5. Fifth Example

Figure 14:
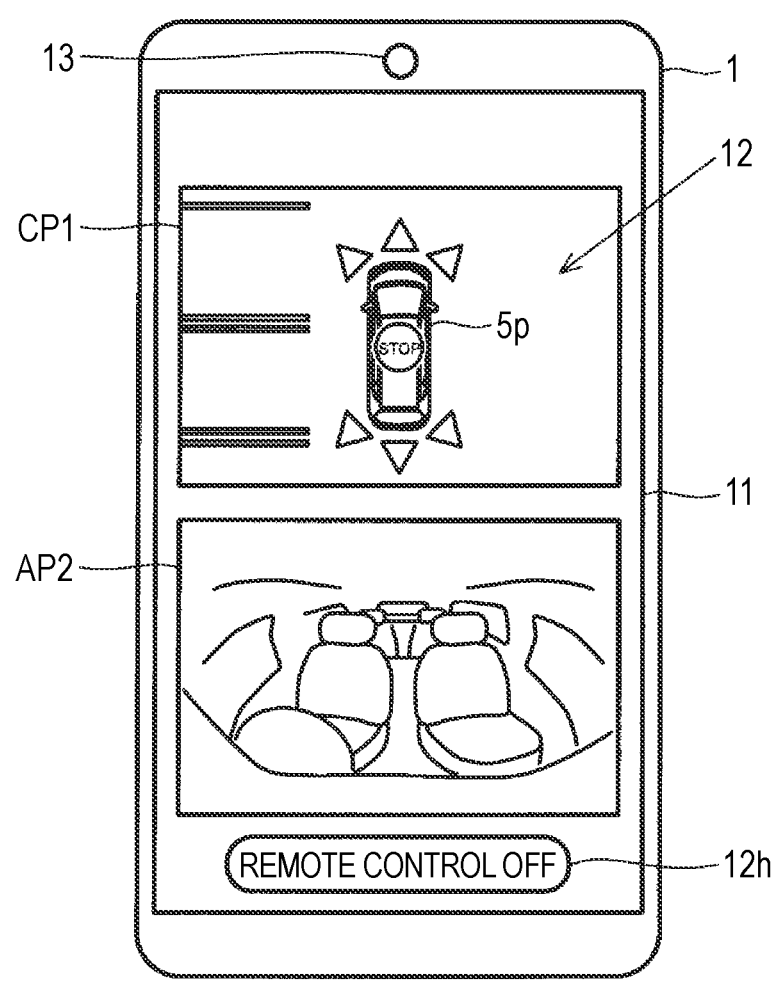
FIG. 14 is a schematic diagram illustrating a mobile terminal displaying a synthetic image and an auxiliary image according to a fifth example.

FIG. 14 is a schematic diagram illustrating the mobile terminal 1 displaying a synthetic image CP1 and an in-vehicle perspective image AP2 according to a fifth example. The mobile terminal 1 of the fifth example displays the plural icons related to remote control on the vehicle 5, as the operation unit 12, on the screen of the display unit 11, so as to overlap the synthetic image CP1.

Further, the display unit 11 of the mobile terminal 1 displays the in-vehicle perspective image AP2 below the synthetic image CP1. To this end, the communication unit 18 receives the in-vehicle perspective image AP2 acquired in the vehicle 5, from the vehicle 5. However, the arrangement of the synthetic image CP1 and the in-vehicle perspective image AP2 in the vertical direction may be changed.

The in-vehicle perspective image AP2 is generated by the image processing device 2 of the vehicle 5. As the in-vehicle perspective image AP2, an image acquired by the in-vehicle camera 45 is used. The image processing device 2 generates an image for display related to the in-vehicle perspective image AP2 to be displayed on the display unit 11 of the mobile terminal 1, on the basis of the image acquired by the in-vehicle camera 45.

According to the configuration of the mobile terminal 1 of the present example, it is possible to perform control authority for the vehicle 5 while checking the condition in the surrounding area of the vehicle 5 and the condition in the vehicle 5, on the display unit 11 of the mobile terminal 1. Therefore, it is possible to improve convenience and operability in remote control on the vehicle 5.

Sixth Example 5-6. Sixth Example

Figure 15:
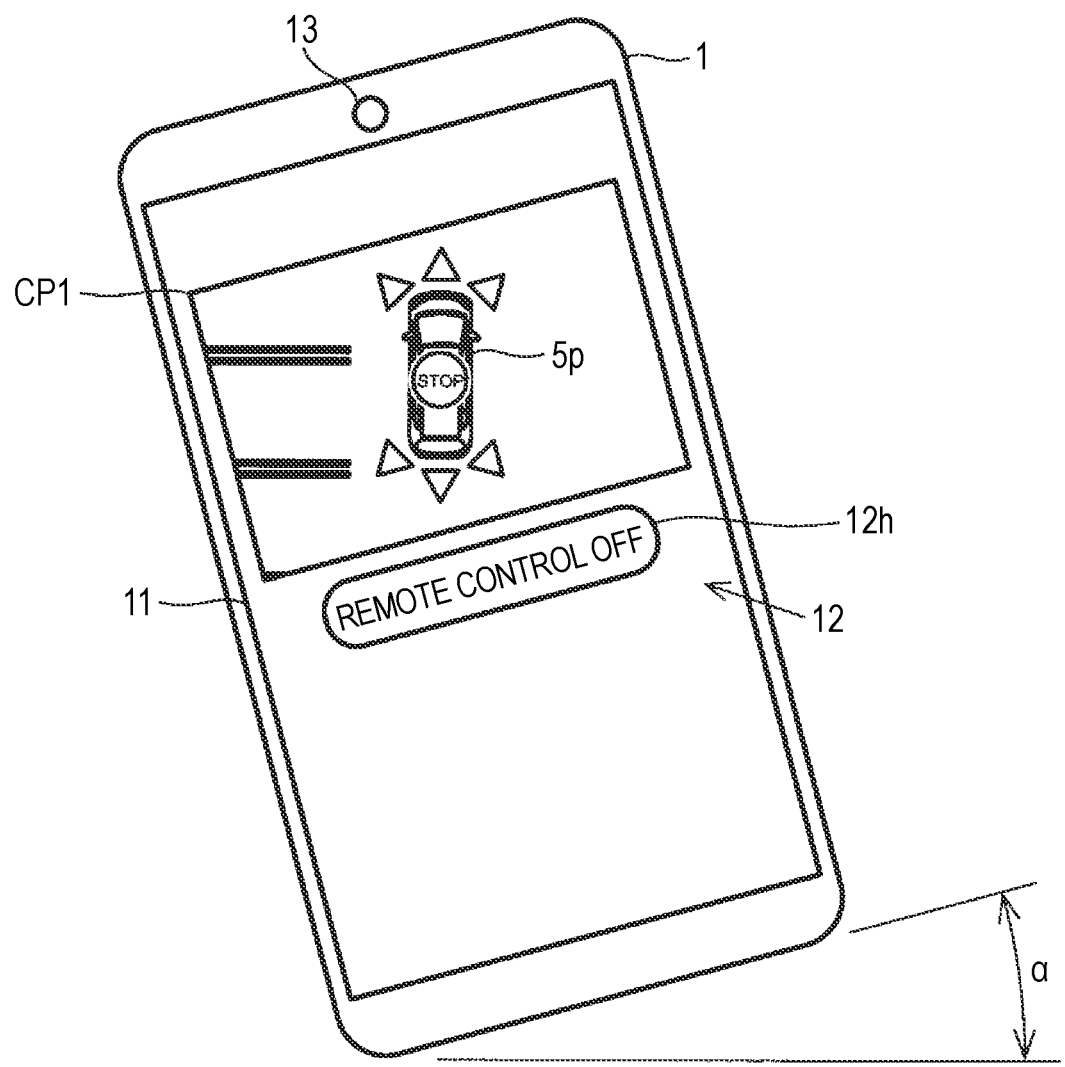
FIG. 15 is a schematic diagram illustrating a mobile terminal displaying a synthetic image according to a sixth example.

FIG. 15 is a schematic diagram of the mobile terminal 1 displaying a synthetic image CP1 according to a sixth example. The mobile terminal 1 of the sixth example displays the plural icons related to remote control on the vehicle 5, as the operation unit 12, on the screen of the display unit 11, so as to overlap the synthetic image CP1.

Further, the display unit 11 displays a synthetic image CP1 based on a different viewpoint position and a different sight line direction based on the tilt of the mobile terminal 1. The sensor unit 15 detects the tilt of the mobile terminal 1 by the tilt sensor.

As shown in FIG. 15, for example, in the case where the mobile terminal 1 is tilted at an angle $\alpha$ such that the upper part looks toward the left side, the display unit 11 displays a synthetic image CP1 based on a different viewpoint position and a different sight line direction defined on the basis of the angle $\alpha$ such that the field of view on the left side of the vehicle T widens. Also, for example, although not shown in the drawings, in the case where the mobile terminal 1 is tilted such that the upper part looks toward the front side, the display unit may display a synthetic image CP1 based on a lower viewpoint position.

According to the configuration of the mobile terminal 1 of the present example, the user may change the viewpoint position and the sight line direction of a synthetic image CP1, by just changing the tilt of the mobile terminal 1. Therefore, the user may easily check the conditions in desired areas, blind areas, and so on around the vehicle 5. Therefore, it is possible to improve convenience and operability in remote control on the vehicle 5.

Seventh Example 5-7. Seventh Example

Figure 16:
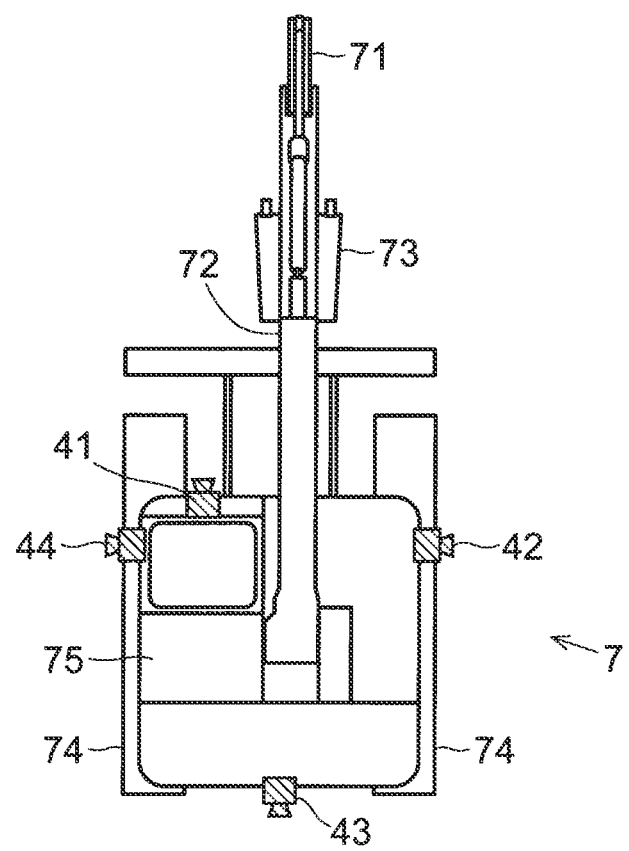
FIG. 16 is a plan view illustrating a vehicle related to a remote vehicle control system of a seventh example.
Figure 17:
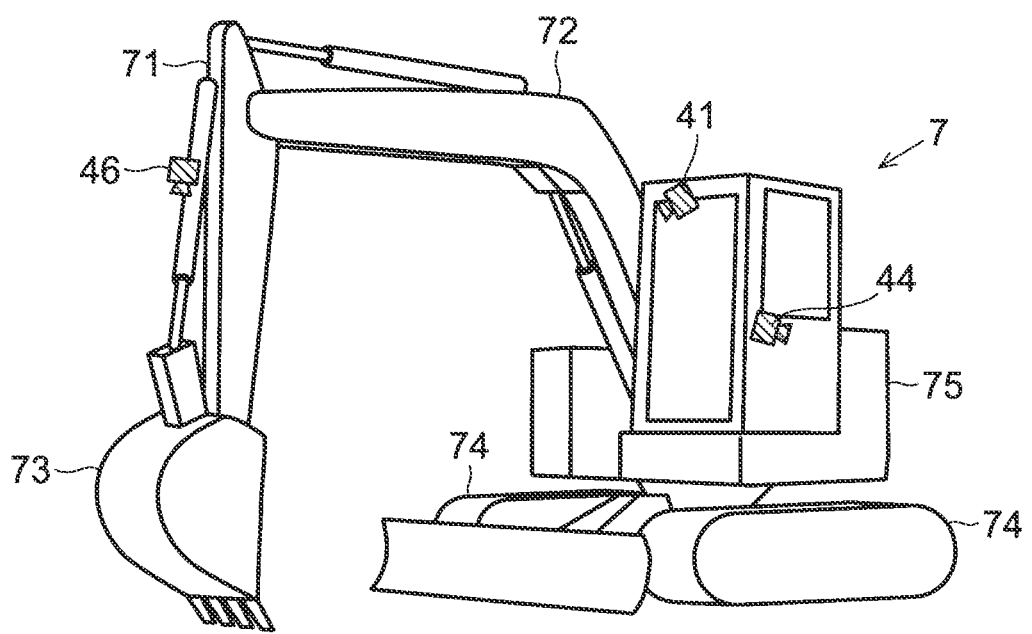
FIG. 17 is a perspective view illustrating the vehicle related to the remote vehicle control system of the seventh example.

FIG. 16 is a plan view illustrating a vehicle 7 related to a remote vehicle control system of a seventh example. FIG. 17 is a perspective view illustrating the vehicle 7 related to the remote vehicle control system of the seventh example. The remote vehicle control system of the seventh example is a system for remotely controlling the vehicle 7 by a mobile terminal capable of displaying synthetic images showing the surrounding area of the vehicle 7.

The vehicle 7 is, for example, a vehicle type construction machine such as a hydraulic shovel shown in FIG. 16 and FIG. 17. However, the vehicle type construction machine is not limited to hydraulic shovels, and may be, for example, a bulldozer, a pile driver, a wheel loader, or the like. Further, the vehicle which is remotely controlled is not limited to passenger vehicles for private use and vehicle type construction machines, and may be, for example, a bus, a truck, or the like, or may be, for example, a special-purpose vehicle such as a fire engine, an ambulance, a patrol car, a garbage wagon, a truck mixer, a tank truck, a crane truck, a trailer truck, or the like.

Although not shown in the drawings, in the present example, similarly to the vehicle 5 described in the first to sixth examples, the vehicle 7 includes an image processing device, a vehicle control device, and a sensor unit.

The vehicle 7 further includes an imaging unit 4. The imaging unit 4 includes, for example, four on-board cameras 41 to 44. The on-board camera 41 is also referred to as the front camera, and is installed on a front part of the vehicle 7, and images the area in front of the vehicle 7. The on-board camera 42 is also referred to as the right side camera, and is installed on the right side surface of the vehicle 7, and images the area on the right side of the vehicle 7. The on-board camera 43 is also referred to as the back camera, and is installed on a rear part of the vehicle 7, and images the area behind the vehicle 7. The on-board camera 44 is also referred to as the left side camera, and is installed on the left side surface of the vehicle 7, and images the area on the left side of the vehicle 7.

Further, as shown in FIG. 17, the imaging unit 4 includes, for example, an on-board camera 46. The on-board camera 46 is installed on an arm 71 of the vehicle 7. For example, the optical axis of the on-board camera 46 extends along the extending direction of the arm 71, and the on-board camera 46 images the area on the leading end side of the arm 71, i.e. the area on the bucket side. However, the on-board camera 46 may be installed on a boom 72, a bucket 73, or the like.

Figure 18:
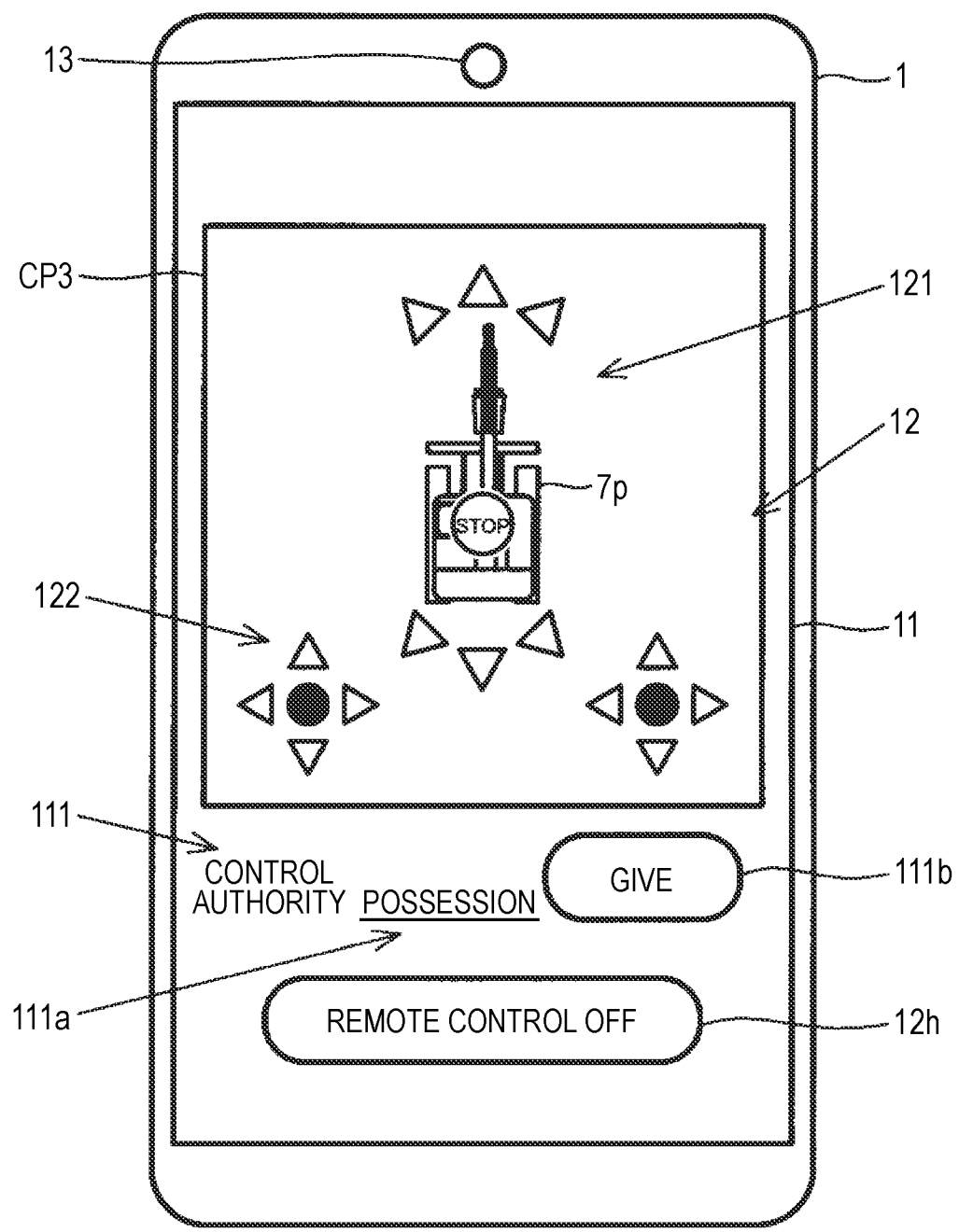
FIG. 18 is a schematic diagram illustrating a mobile terminal displaying a synthetic image according to the seventh example.

The mobile terminal 1 may receive synthetic images generated by the image processing device of the vehicle 7 and showing the surrounding area of the vehicle 7 as seen from virtual viewpoints, via the communication unit 18. The mobile terminal 1 may display the synthetic images on the display unit 11. FIG. 18 is a schematic diagram illustrating the mobile terminal 1 displaying a synthetic image CP3 according to the seventh example. The synthetic image CP3 is, for example, a bird's eye view image showing the surrounding area of the vehicle 7.

On the synthetic image CP3, icons and so on which are images of the operation unit 12 are superimposed. The operation unit 12 is disposed according to the position and orientation of an image 7p of the vehicle 7 included in the synthetic image CP3.

Specifically, for example, in the vicinity of the image 7p of the vehicle 7, icons 121 related to traveling of the vehicle 7, i.e. icons 121 related to control on left and right crawlers 74 of the vehicle 7 are displayed. The icons 121 related to traveling of the vehicle 7 are disposed according to positions and directions corresponding to individual traveling directions, for example, around the image 7p of the vehicle 7. Also, a "STOP" icon related to stopping of the vehicle 7 is disposed so as to overlap the image 7p of the vehicle 7.

Also, for example, below the image 7p of the vehicle 7, icons 122 related to operations of an upper rotary structure 75 of the vehicle 7 and work units (the arm 71, the boom 72, and the bucket 73) are displayed. The icons 122 related to operations of the vehicle 7 are disposed according to positions and directions corresponding to individual operation directions, for example, around images (black solid circles in the synthetic image CP3) corresponding to two control levers drawn below the image 7p of the vehicle 7.

Also, the remote vehicle control system of the seventh example may remotely control the vehicle 7 by each of the mobile terminal 1 and the other mobile terminals which are remote vehicle control devices. The mobile terminal 1 displays information related to the control authority for the vehicle 7 as an image 111 on the display unit 11. The image 111 of the information related to the control authority for the vehicle 7 includes a control-authority possession/non-possession image 111a and a control-authority transfer key 111b.

The mobile terminal 1 performs transfer of the control authority for the vehicle 7 in cooperation with the other mobile terminals by the authority managing unit. According to this configuration, it is also possible to remotely control each of vehicle type construction machines like the vehicle 7, other special-purpose vehicles, and so on by people while checking the surrounding area of the vehicle 7 on synthetic images CP3. For example, in the case where a blind area occurs, the user may hand over the control authority for the vehicle 7 to another person easy to check the condition in the blind area. In other words, it is possible to improve convenience and operability in remote control on the vehicle 7.

Also, the display unit 11 of the mobile terminal 1 may display auxiliary images besides synthetic images CP3. As such auxiliary images, for example, images which are acquired by the on-board camera 46 mounted on the arm 71 may be used. According to this configuration, it is possible to perform remote control on the vehicle 7 while checking not only the condition in the surrounding area of the vehicle 7 but also the condition in the area on the leading end of the arm 71. Therefore, it is possible to further more improve convenience and operability in remote control on the vehicle 7.

Eighth Example 5-8. Eighth Example

Figure 19:
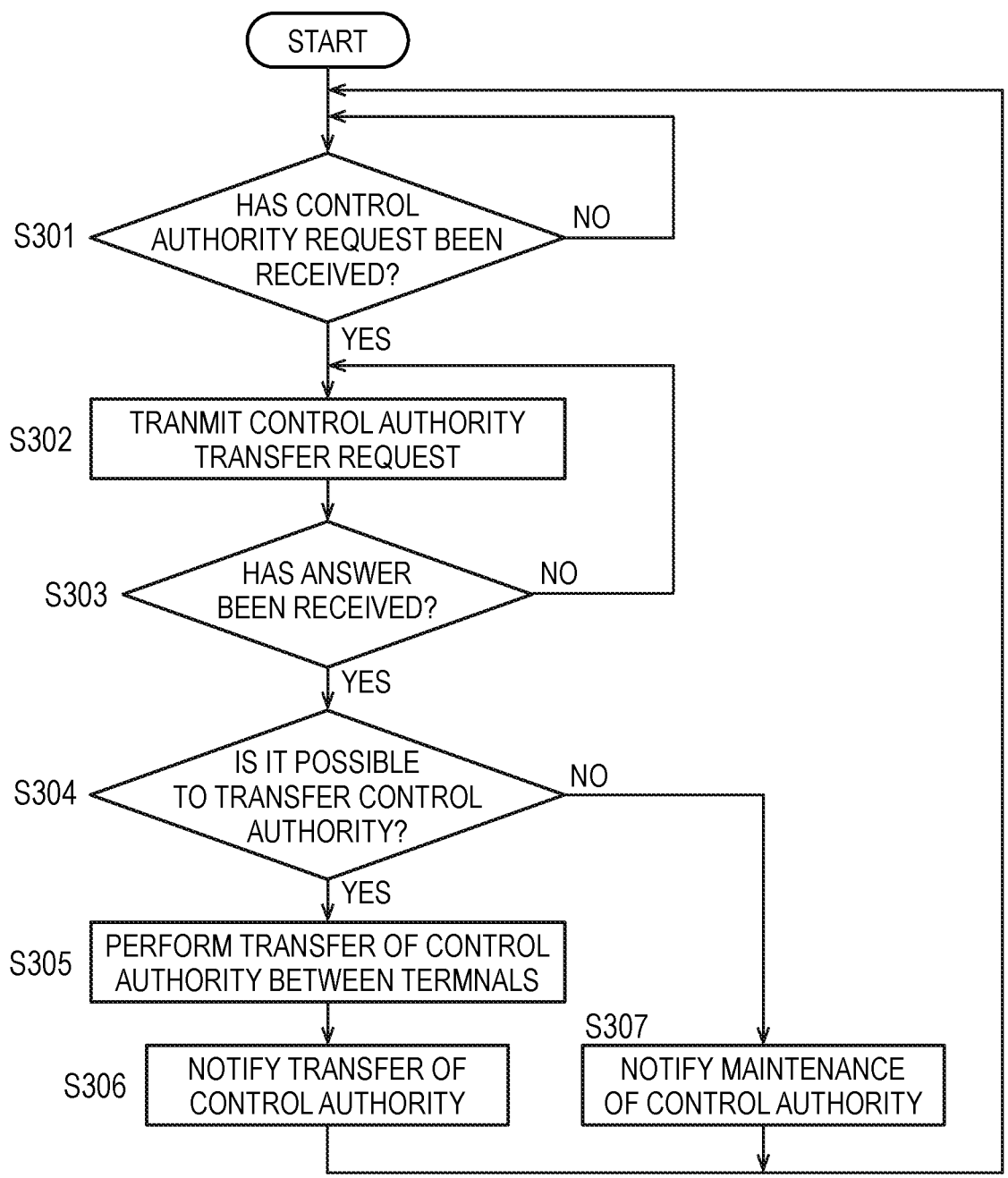
FIG. 19 is a flow chart illustrating an example of the flow of processing of a vehicle related to remote vehicle control according to an eighth example.

In a remote vehicle control system RS of an eighth example, the vehicle 5 manages the authority of each of, for example, the mobile terminals 1, 1x, and 1y for controlling the vehicle 5. FIG. 19 is a flow chart illustrating an example of the flow of processing of the vehicle 5 related to remote vehicle control according to the eighth example. Processing of the eighth example related to transfer of the control authority for the vehicle 5 will be described with reference to FIG. 19.

If remote control on the vehicle 5 is started by a mobile terminal, and the vehicle 5 performs a communication establishment process and a remote control establishment process in cooperation with the mobile terminal, the vehicle starts the processing related to transfer of the control authority for the vehicle 5 ("START" of FIG. 19). In the case where remote control may be performed by plural mobile terminals, the control authority for the vehicle 5 is given to a predetermined mobile terminal.

Next, the vehicle 5 determines whether a control authority request signal has been received from any other mobile terminal (STEP S301). In the case where a control authority request signal has been received ("Yes" in STEP S301), the vehicle 5 transmits a signal related to a control authority transfer request to the mobile terminal having the control authority at that moment (STEP S302). Then, the vehicle 5 waits for the answer to the control authority transfer request to be received from the mobile terminal having the control authority (STEP S303).

If the answer to the control authority transfer request is received from the mobile terminal having the control authority ("Yes" in STEP S303), the vehicle 5 determines whether the received answer is an answer representing that it is possible to transfer the control authority (STEP S304). In the case where the received answer is an answer representing that it is possible to transfer the control authority ("Yes" in STEP S304), the vehicle 5 performs a process of performing transfer of the control authority between the mobile terminals. In the vehicle 5, for example, information which defines the mobile terminal which has had the control authority until that moment as a mobile terminal which does not have the control authority after that moment and defines the mobile terminal which transmitted the control authority request signal as a mobile terminal which newly has the control authority is stored.

Next, the vehicle 5 notifies the transfer of the control authority to each mobile terminal (STEP S306). In each of the mobile terminals, a control authority transfer process is performed. The mobile terminal having had the control authority until that moment loses the control authority. If the control authority related to traveling of the vehicle 5 is lost, for example, the icons (the operation unit 12) related to traveling of the vehicle 5 are deleted from the synthetic image CP1. Also, the mobile terminal which transmitted the control authority request signal newly obtains the control authority. If the control authority related to traveling of the vehicle 5 is obtained, for example, the icons (the operation unit 12) related to traveling of the vehicle 5 are displayed on synthetic images CP1.

Meanwhile, in the case where the answer to the control authority transfer request is an answer representing that it is impossible to transfer the control authority ("No" in STEP S304), the vehicle 5 notifies the maintenance of the control authority to each mobile terminals (STEP S307).

Then, the vehicle 5 returns to STEP S301, and carries on determining whether a control authority request signal has been received.

According to this configuration, it is possible to reduce the load of each mobile terminal related to transfer of the control authority for the vehicle 5. Therefore, it is possible to perform remote control using the mobile terminals, quickly and stably, and it is possible to improve convenience and operability in remote control on the vehicle 5.

Ninth Example 5-9. Ninth Example

Figure 20:
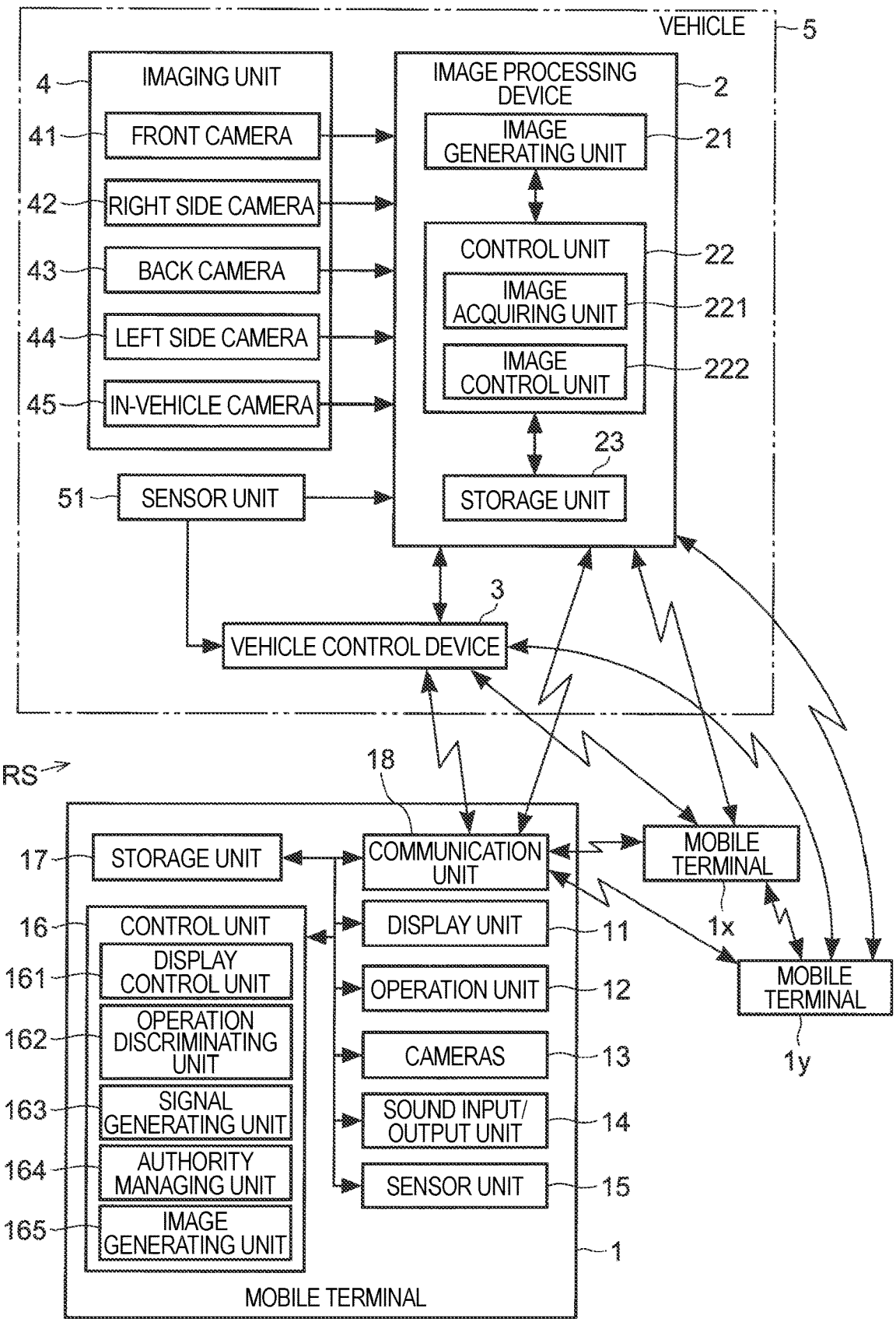
FIG. 20 is a block diagram illustrating the configuration of a remote vehicle control system of a ninth example.

FIG. 20 is a block diagram illustrating the configuration of a remote vehicle control system RS of a ninth example. A mobile terminal 1 of the ninth example has an image generating unit 165, for example, in the control unit 16. The image generating unit 165 generates synthetic images showing the surrounding area of the vehicle 5 by processing images acquired by the imaging unit 4 of the vehicle 5. In the present example, the image generating unit 164 implements a variety of image processing in a software wise, for example, according to a program stored in the storage unit 17.

The mobile terminal 1 receives a variety of data necessary for image processing of the image generating unit 165, from the vehicle 5 via the communication unit 18. As the data necessary for image processing, for example, images acquired by the on-board cameras 41 to 44, the installation states (the installation positions and the camera angles) of the on-board cameras 41 to 44, the camera characteristics (the image size and the image scale), data on images 5*p* and transparent images 5*t* of the vehicle 5, and so on are included. The data received from the vehicle 5 is stored, for example, in the storage unit 17.

The image generating unit 165 generates synthetic images showing the surrounding area of the vehicle 5 as seen from virtual viewpoints, on the basis of images acquired by the on-board cameras 41 to 44 and received from the vehicle 5. Further, the image generating unit 165 generates images for display to be displayed on the display unit 11, on the basis of the synthetic images. The image generating unit 165 may also generate bird's eye view images and in-vehicle perspective images as synthetic images.

When the user performs remote control on the vehicle 5 using the mobile terminal 1, the mobile terminal 1 performs the communication establishment process and the remote control establishment process in cooperation with the vehicle 5, and then receives a variety of data necessary for image processing of the image generating unit 165 from the vehicle 5. Such data is stored, for example, in the storage unit 17. Thereafter, on the basis of inputs based on user's operations on the operation unit 12, the image generating unit 165 sequentially receives images acquired by the on-board cameras 41 to 44 from the vehicle 5, and generates synthetic images.

6. Others

Various technical features disclosed in this specification can be modified variously without departing from the spirit of the technical invention besides the embodiment described above. In other words, it should be understood that the embodiments described above are illustrative and non-restrictive in every respect. It should be understood that the scope of the present invention is defined by the terms of the claims, rather than the description above, and is intended to include any modifications within the scope and meaning equivalent to the terms of the claims. Also, some of the embodiment, the examples, and the modifications described above may be appropriately combined in an acceptable range.

Also, in the above-described embodiment, various functions are implemented in a software wise by computing of the CPUs according to the programs; however, at least some of those functions may be implemented by electrical hardware circuits. Also, conversely, some of functions which are implemented by hardware circuits may be implemented in a software wise.

What is claimed is:

1. A remote vehicle control device comprising:
a display; and
at least one processor configured to:
generate control signals for a vehicle, based on operations,
perform communication with the vehicle and another remote vehicle control device to transmit the control signals to the vehicle, and manage a control authority for the vehicle, wherein
synthetic images showing a surrounding area of the vehicle as seen from a virtual viewpoint each are generated based on a plurality of images acquired by a plurality of on-board cameras mounted on the vehicle, respectively, and the display displays the synthetic images,
the at least one processor performs transfer of the control authority for the vehicle in cooperation with the another remote vehicle control device, and
the at least one processor separately manages each of a plurality of types of control authority for the vehicle, between the remote vehicle control device and the another remote vehicle control device.

2. The remote vehicle control device according to claim 1, wherein:
the at least one processor receives the synthetic images generated in the vehicle, from the vehicle.

3. The remote vehicle control device according to claim 1, wherein:
the control signals include signals related to control on viewpoint positions and sight line directions of the synthetic images.

4. The remote vehicle control device according to claim 1, wherein:
the at least one processor manages some of the plurality of types of control authority for the vehicle, such that they are handled as one in the remote vehicle control device and the another remote vehicle control device.

5. The remote vehicle control device according to claim 1, wherein:
the at least one processor manages some of the plurality of types of control authority for the vehicle, such that they are shared by the remote vehicle control device and the another remote vehicle control device.

6. The remote vehicle control device according to claim 1, wherein:
the at least one processor receives display images of another display of the another remote vehicle control device, from the another remote vehicle control device, and
the display displays the display images.

7. The remote vehicle control device according to claim 1, wherein:
at a beginning of synthetic image display, the display consecutively displays synthetic images along a circumference of the surrounding area of the vehicle.

8. The remote vehicle control device according to claim 1, wherein:
at a beginning of synthetic image display, the display displays a synthetic image as seen from an opposite side of the vehicle to a location of the remote vehicle control device.

9. The remote vehicle control device according to claim 1, wherein:
as the remote vehicle control device moves, the display displays synthetic images based on different viewpoint positions and different sight line directions.

10. The remote vehicle control device according to claim 1, wherein:
the at least one processor receives information related to a controlled state of the vehicle, from the vehicle, and
the display displays the information related to the controlled state.

11. The remote vehicle control device according to claim 1, wherein:
the at least one processor receives in-vehicle perspective images obtained by imaging an inside of the vehicle, from the vehicle, and
the display displays the in-vehicle perspective images.

12. The remote vehicle control device according to claim 1, further comprising:
a sensor configured to detect a tilt of the remote vehicle control device,
wherein the display displays synthetic images based on a different viewpoint position and a different sight line direction, based on the tilt that has been detected.

13. The remote vehicle control device according to claim 1, further comprising:
memory configured to store the synthetic images displayed on the display.

14. A remote vehicle control method comprising:
generating each of synthetic images of a surrounding area of a vehicle as seen from virtual viewpoints, based on a plurality of images acquired by a plurality of on-board cameras mounted on the vehicle, respectively;
displaying the synthetic images on a remote vehicle control device;
receiving operations for the vehicle on the remote vehicle control device;
generating control signals for the vehicle, based on operations;
transmitting the control signals from the remote vehicle control device to the vehicle; and
performing transfer of control authority for the vehicle between the remote vehicle control device and another remote vehicle control device, wherein
each of a plurality of types of control authority for the vehicle are separately managed between the remote vehicle control device and the another remote vehicle control device.

* * * * *